United States Patent
Takahashi et al.

(10) Patent No.: US 12,541,866 B2
(45) Date of Patent: Feb. 3, 2026

(54) MEDICAL IMAGE PROCESSING APPARATUS, METHOD, AND COMPUTER READABLE MEDIUM THAT ANALYZE A FLUORESCENCE IMAGE FROM PHOSPHOR IN BIOLOGICAL TISSUE

(71) Applicant: Sony Group Corporation, Tokyo (JP)

(72) Inventors: Minori Takahashi, Tokyo (JP); Kentaro Fukazawa, Kanagawa (JP); Daisuke Kikuchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 315 days.

(21) Appl. No.: 18/546,782

(22) PCT Filed: Feb. 2, 2022

(86) PCT No.: PCT/JP2022/003924
§ 371 (c)(1),
(2) Date: Aug. 17, 2023

(87) PCT Pub. No.: WO2022/181263
PCT Pub. Date: Sep. 1, 2022

(65) Prior Publication Data
US 2024/0303842 A1    Sep. 12, 2024

(30) Foreign Application Priority Data
Feb. 24, 2021    (JP) ................. 2021-027800

(51) Int. Cl.
*G06T 7/50*    (2017.01)
*A61B 5/00*    (2006.01)
(Continued)

(52) U.S. Cl.
CPC .............. *G06T 7/50* (2017.01); *A61B 5/0071* (2013.01); *G06T 5/73* (2024.01); *G06T 7/73* (2017.01);
(Continued)

(58) Field of Classification Search
CPC ... G06T 7/50; G06T 7/73; G06T 2207/10064; G06T 7/0012; A61B 5/0071; A61B 1/00;
(Continued)

(56) References Cited

U.S. PATENT DOCUMENTS

2009/0147998 A1*  6/2009  Yamaguchi ............... G06T 5/73
                                                              382/106
2012/0154567 A1*  6/2012  Yamaguchi .......... A61B 1/0653
                                                              348/E7.085

FOREIGN PATENT DOCUMENTS

JP    2009-153970 A      7/2009
JP    2010-051350 A      3/2010
JP    6295396 B2 *       3/2018

OTHER PUBLICATIONS

International Search Report and Written Opinion mailed on Apr. 26, 2022, received for PCT Application PCT/JP2022/003924, filed on Feb. 2, 2022, 9 pages including English Translation.

* cited by examiner

*Primary Examiner* — Andrew M Moyer
*Assistant Examiner* — Conor A O'Malley
(74) *Attorney, Agent, or Firm* — XSENSUS LLP

(57) ABSTRACT

Provided is a technique advantageous for acquiring information based on a depth position of an observation target site in a biological tissue.
A medical image processing apparatus includes: an image acquisition unit that acquires a fluorescence image obtained by imaging a biological tissue including a phosphor while irradiating the biological tissue with excitation light; and a
(Continued)

depth position information acquisition unit that acquires depth position information related to a depth position of the phosphor on the basis of the fluorescence image. The depth position information acquisition unit acquires spread information indicating an image intensity distribution of the phosphor in the fluorescence image by analyzing the fluorescence image, and acquires the depth position information by collating the spread information with a spread function representing an image intensity distribution in the biological tissue.

10 Claims, 22 Drawing Sheets

(51) Int. Cl.
  *G06T 5/73*  (2024.01)
  *G06T 7/73*  (2017.01)
  *G06V 10/764*  (2022.01)
(52) U.S. Cl.
  CPC .. *G06V 10/764* (2022.01); *G06T 2207/10064* (2013.01); *G06T 2207/30101* (2013.01); *G06V 2201/03* (2022.01)
(58) Field of Classification Search
  CPC .. A61B 10/00; G06V 10/764; G06V 2201/03; G01N 21/64
  See application file for complete search history.

MEDICAL IMAGE PROCESSING APPARATUS, METHOD, AND COMPUTER READABLE MEDIUM THAT ANALYZE A FLUORESCENCE IMAGE FROM PHOSPHOR IN BIOLOGICAL TISSUE

CROSS-REFERENCE TO RELATED APPLICATIONS

The present application is based on PCT filing PCT/JP2022/003924, filed Feb. 2, 2022, which claims priority to Japanese Patent Application No. 2021-027800, filed Feb. 24, 2021, the contents of each are incorporated herein by reference.

TECHNICAL FIELD

The present disclosure relates to a medical image processing apparatus, a medical image processing method, and a program.

BACKGROUND ART

In a technical field of ecological observation, a biological tissue is labeled with a fluorescence reagent, and a fluorescence image of the biological tissue is observed. By using the fluorescence reagent, it is possible to visualize biological tissues such as blood vessels, blood flows, lymph flows, and tumors, which are difficult to visually recognize and image with naked eyes under white light, in a visible manner. An operator can perform an accurate surgery (that is, fluorescence-guided surgery) by performing a procedure while confirming the fluorescence image together with a normal observation image obtained under the white light.

On the other hand, the fluorescence image is blurred by fluorescence scattering in the biological tissue. In particular, a degree of blurring of the fluorescence image tends to increase as a distance from a surface of the biological tissue to an observation target (phosphor) such as a blood vessel and the like increases. Therefore, there is a case where it is difficult to clearly grasp a boundary of the phosphor in the fluorescence image. Furthermore, it is not easy to visually and accurately determine a depth position of the phosphor in the biological tissue from the fluorescence image.

Patent Document 1 discloses an apparatus that determines a depth position of a blood vessel using a plurality of spectral images having different wavelength ranges and performs blood vessel enhancement processing corresponding to the depth position on a fluorescence image of the blood vessel.

CITATION LIST

Patent Document

Patent Document 1: Japanese Patent Application Laid-Open No. 2010-51350

SUMMARY OF THE INVENTION

Problems to be Solved by the Invention

The apparatus of Patent Document 1 acquires spectral images on the basis of a normal observation image captured by irradiating a blood vessel with white light, and determines a depth position of the blood vessel on the basis of the spectral images.

Therefore, a target such as the blood vessel and the like in which the apparatus of Patent Document 1 can determine the depth position is limited to a target that can be captured in the normal observation image. That is, the apparatus of Patent Document 1 cannot determine the depth position of the target that cannot be captured in the normal observation image. Therefore, the apparatus of Patent Document 1 cannot determine the depth position of the target that can be captured in the fluorescence image but cannot be captured in the normal observation image.

Therefore, the apparatus of Patent Document 1 cannot determine a depth position of a deep tissue having a large distance from a surface of a biological tissue, for example.

The present disclosure provides a technique advantageous for acquiring information based on a depth position of an observation target site in a biological tissue.

Solutions to Problems

One aspect of the present disclosure relates to a medical image processing apparatus including: an image acquisition unit that acquires a fluorescence image obtained by imaging a biological tissue including a phosphor while irradiating the biological tissue with excitation light; and a depth position information acquisition unit that acquires depth position information related to a depth position of the phosphor on the basis of the fluorescence image, in which the depth position information acquisition unit acquires spread information indicating an image intensity distribution of the phosphor in the fluorescence image by analyzing the fluorescence image, and acquires the depth position information by collating the spread information with a spread function representing an image intensity distribution in the biological tissue.

The image acquisition unit may acquire a visible light image obtained by imaging the biological tissue while irradiating the biological tissue with visible light, and the depth position information acquisition unit may estimate a type of the biological tissue by analyzing the visible light image, and acquire the spread function according to the estimated type of the biological tissue.

The spread information may be a luminance distribution of the phosphor in the fluorescence image, and the spread function may be a line spread function based on the luminance distribution of the phosphor and the depth position information.

The spread function may include a scattering coefficient determined according to a fluorescence wavelength of the phosphor as a parameter, and the depth position information acquisition unit may acquire the scattering coefficient corresponding to the fluorescence wavelength, and acquire the depth position information on the basis of the spread function reflecting the scattering coefficient and the spread information.

The biological tissue may include a plurality of phosphors having different fluorescence wavelengths, the image acquisition unit may acquire the fluorescence image obtained by irradiating the biological tissue with the excitation light of each of the plurality of phosphors and imaging the biological tissue, and the depth position information acquisition unit may acquire the depth position information on each of the plurality of phosphors on the basis of the fluorescence image.

The depth position information acquisition unit may acquire relative depth position information indicating a relative relationship of the depth positions among the plurality of phosphors on the basis of the depth position information on each of the plurality of phosphors.

The medical image processing apparatus may further include an image quality adjustment unit that performs sharpening processing according to the depth position information on the fluorescence image.

The medical image processing apparatus may further include an observation image generation unit that generates an observation image, in which the image acquisition unit may acquire a visible light image obtained by imaging the biological tissue while irradiating the biological tissue with visible light, and in the observation image, a portion corresponding to the phosphor in the fluorescence image after undergoing the sharpening processing may be superimposed on the visible light image.

The biological tissue may include a plurality of phosphors having different fluorescence wavelengths, the image acquisition unit may acquire the fluorescence image obtained by imaging the biological tissue while irradiating the biological tissue with the excitation light of each of the plurality of phosphors, the depth position information acquisition unit may acquire the depth position information on each of the plurality of phosphors on the basis of the fluorescence image, and the observation image generation unit may adjust relative brightness between the plurality of phosphors for portions corresponding to the plurality of phosphors in the fluorescence image, and generate the observation image by superimposing, on the visible light image, the portions corresponding to the plurality of phosphors in the fluorescence image after the relative brightness between the plurality of phosphors is adjusted.

The medical image processing apparatus may further include an observation image generation unit that generates an observation image, in which the image acquisition unit may acquire a visible light image obtained by imaging the biological tissue while irradiating the biological tissue with visible light, and the observation image generation unit may specify a range of the phosphor in the biological tissue by analyzing the fluorescence image after undergoing the sharpening processing, and generate the observation image in which a portion corresponding to the range of the phosphor is emphasized in the visible light image.

The observation image generation unit may generate the observation image in which the portion corresponding to the range of the phosphor in the visible light image is emphasized according to the depth position information.

Another aspect of the present disclosure relates to a medical image processing method including: a step of acquiring a fluorescence image obtained by imaging a biological tissue including a phosphor while irradiating the biological tissue with excitation light; a step of acquiring spread information indicating an image intensity distribution of the phosphor in the fluorescence image by analyzing the fluorescence image; and a step of acquiring depth position information related to a depth position of the phosphor by collating the spread information with a spread function representing an image intensity distribution in the biological tissue.

Another aspect of the present disclosure relates to a program for causing a computer to execute: a procedure of acquiring a fluorescence image obtained by imaging a biological tissue including a phosphor while irradiating the biological tissue with excitation light; a procedure of acquiring spread information indicating an image intensity distribution of the phosphor in the fluorescence image by analyzing the fluorescence image; and a procedure of acquiring depth position information related to a depth position of the phosphor by collating the spread information with a spread function representing an image intensity distribution in the biological tissue.

MODES FOR CARRYING OUT THE INVENTION

Hereinafter, typical embodiments of the present disclosure will be exemplarily described with reference to the drawings.

First Embodiment

[Medical Observation System]

Figure 1:
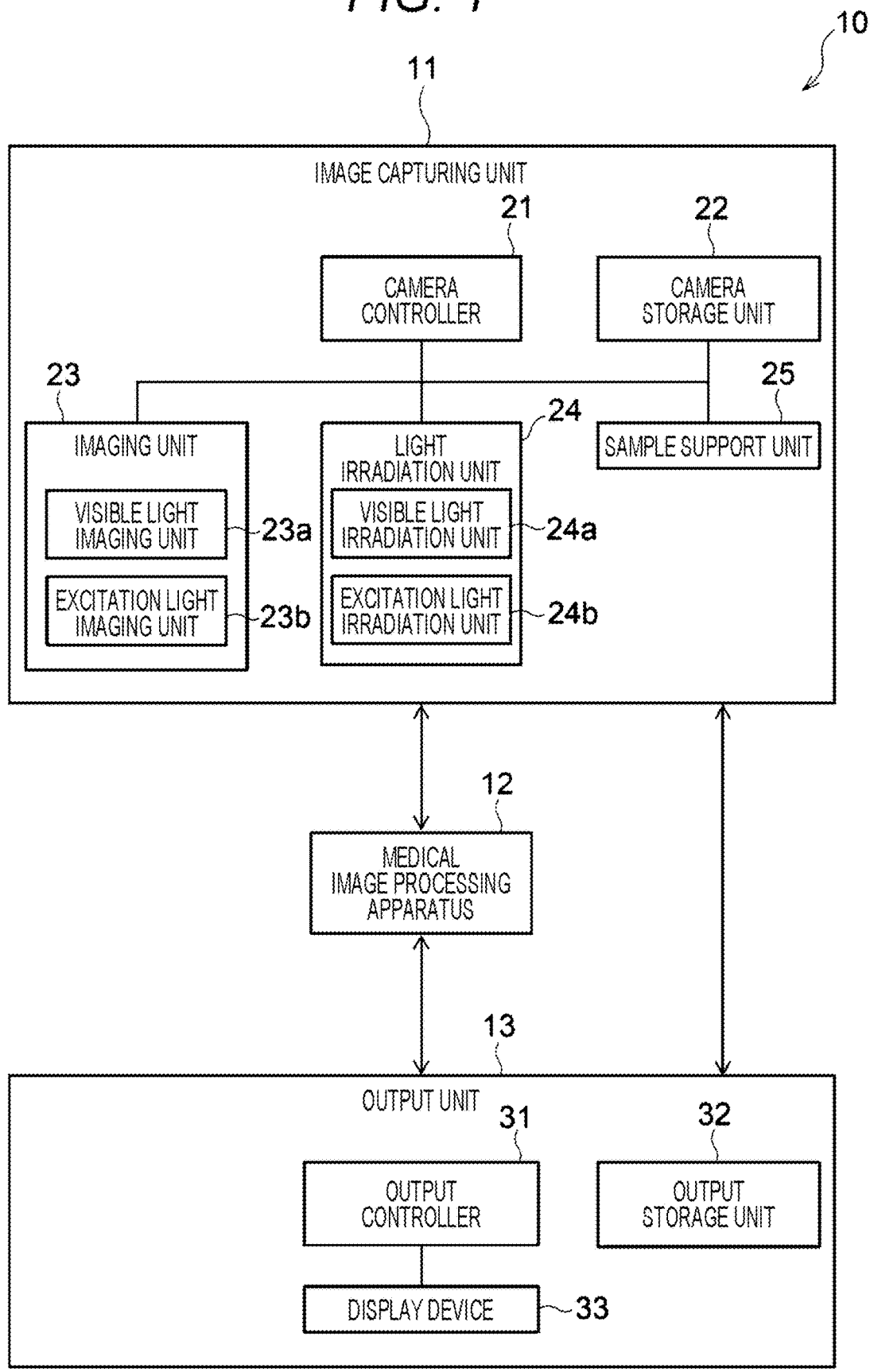
FIG. 1 is a block diagram illustrating an example of a medical observation system.
Figure 2:
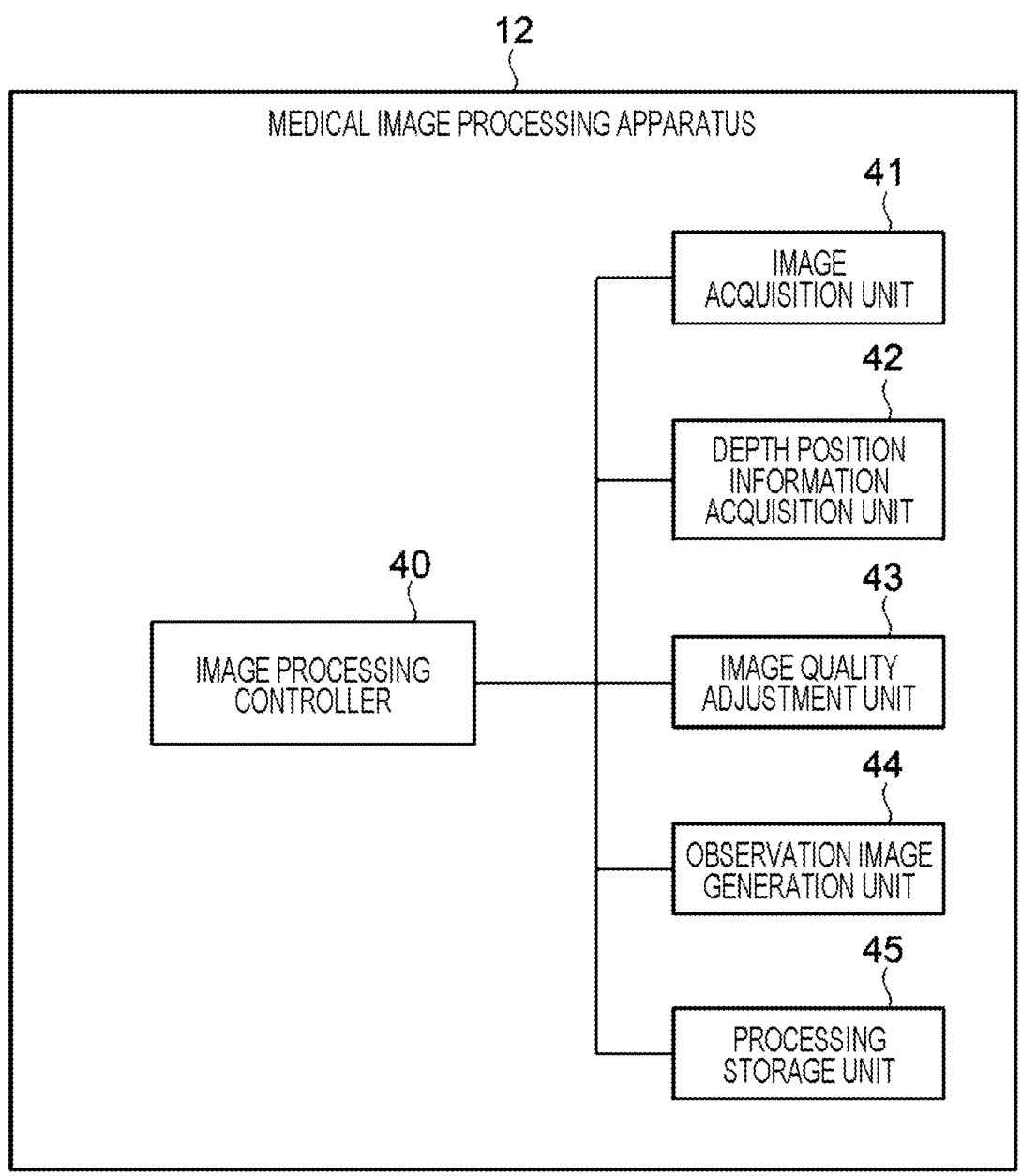
FIG. 2 is a block diagram illustrating an example of a medical image processing apparatus.
Figure 3:
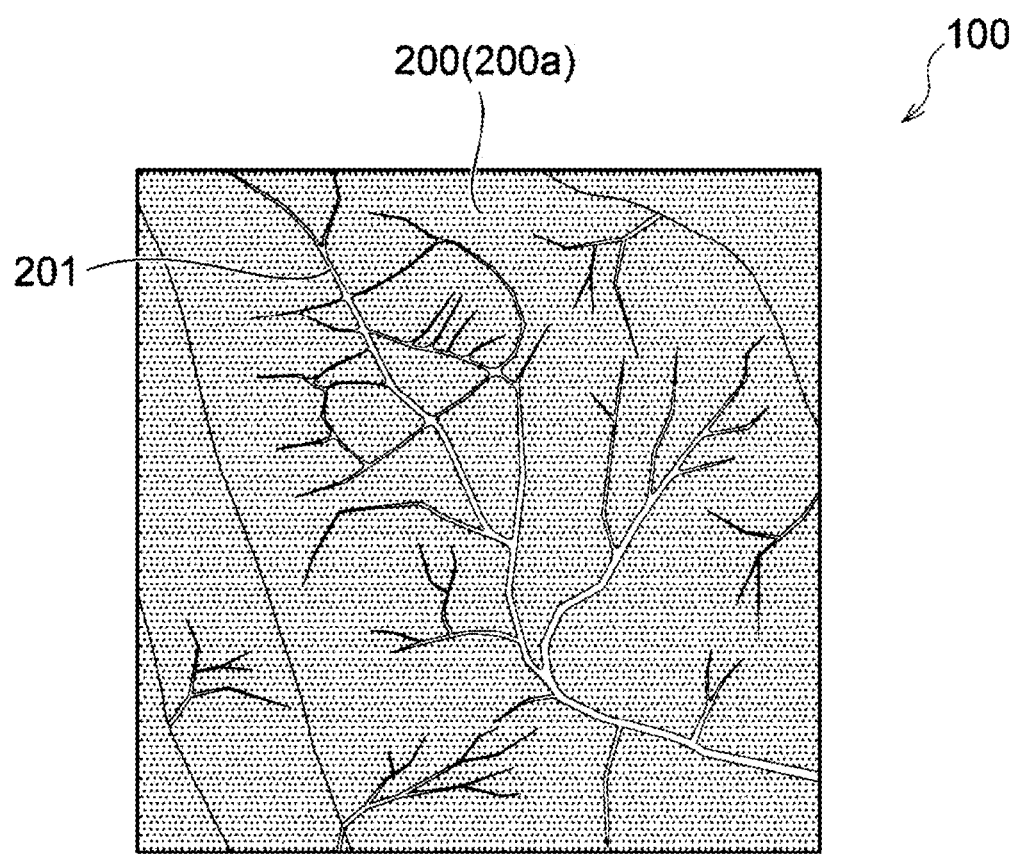
FIG. 3 illustrates an example of a visible light image (normal observation image) of a biological tissue.
Figure 4:
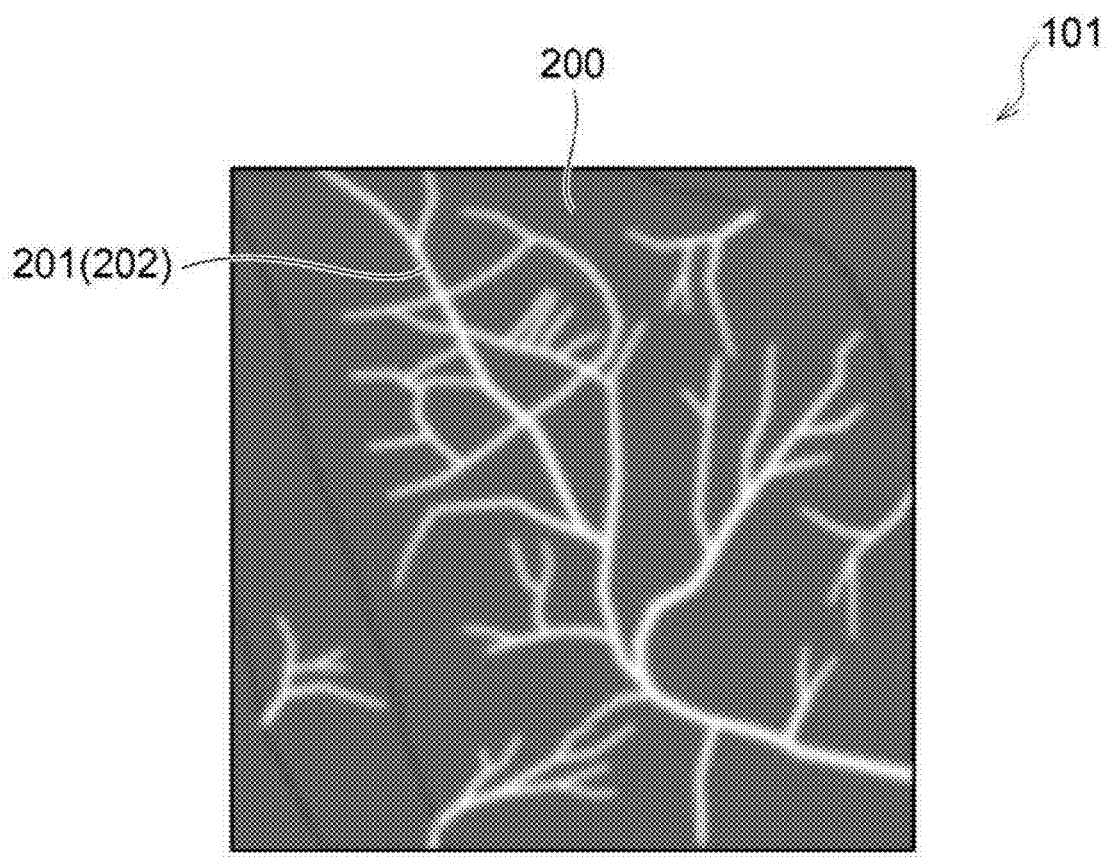
FIG. 4 illustrates an example of a fluorescence image of the biological tissue.
Figure 5:
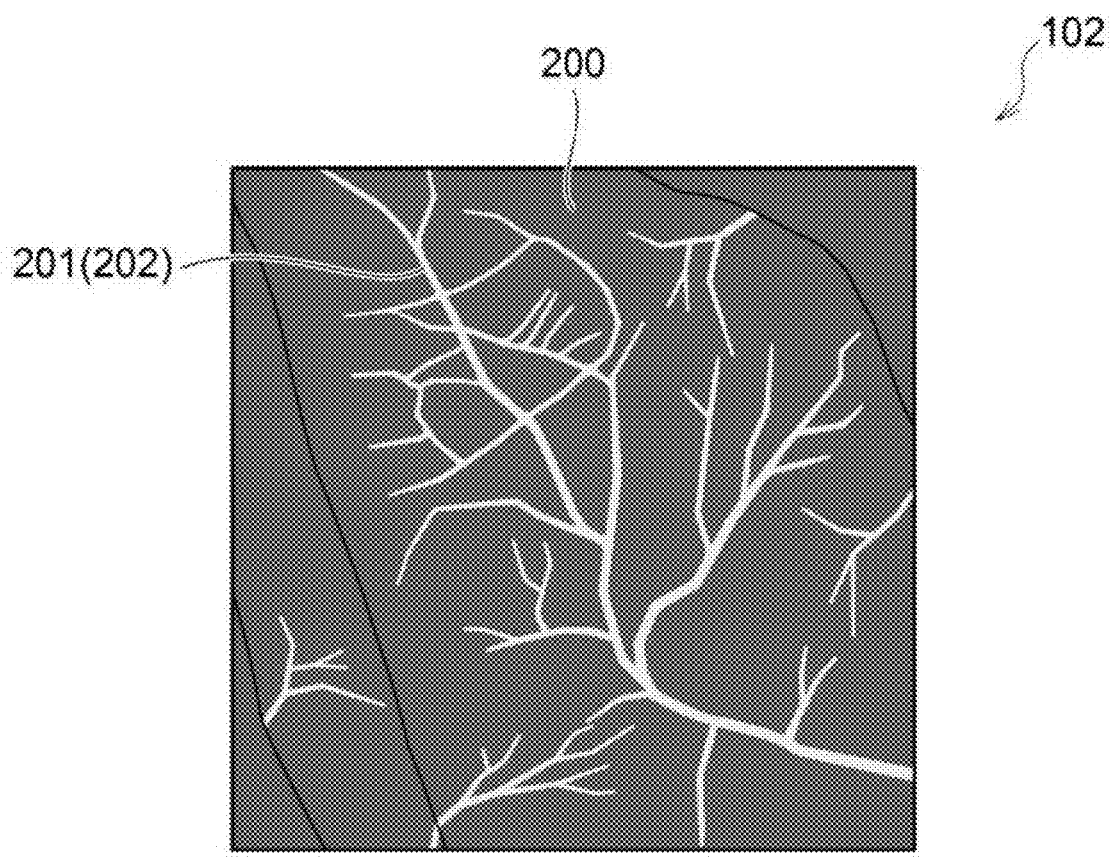
FIG. 5 illustrates an example of a fluorescence image (that is, a sharp fluorescence image) obtained by performing sharpening processing on the fluorescence image illustrated in FIG. 4.

FIG. 1 is a block diagram illustrating an example of a medical observation system 10. FIG. 2 is a block diagram illustrating an example of a medical image processing apparatus 12. FIG. 3 illustrates an example of a visible light image (normal observation image) 100 of a biological tissue 200. FIG. 4 illustrates an example of a fluorescence image 101 of the biological tissue 200. FIG. 5 illustrates an example of the fluorescence image 101 (that is, a sharp fluorescence image 102) obtained by performing sharpening processing (scattering suppression processing) on the fluorescence image 101 illustrated in FIG. 4.

The medical observation system 10 illustrated in FIG. 1 includes an image capturing unit 11, a medical image processing apparatus 12, and an output unit 13.

The image capturing unit 11, the medical image processing apparatus 12, and the output unit 13 may be provided integrally or separately. For example, two or more controllers among the image capturing unit 11, the medical image processing apparatus 12, and the output unit 13 may be configured by a common control unit.

The image capturing unit 11, the medical image processing apparatus 12, and the output unit 13 include a transmission/reception unit (not illustrated), and can transmit/receive data to/from each other in a wired and/or wireless manner.

The image capturing unit 11 images the biological tissue 200 including a phosphor 202 such as a blood vessel 201 and the like while irradiating the biological tissue 200 with visible light, thereby acquiring the visible light image 100 of the biological tissue 200 (see FIG. 3). Furthermore, the image capturing unit 11 images the biological tissue 200 while irradiating the biological tissue 200 with excitation light, thereby acquiring the fluorescence image 101 of the biological tissue 200 (see FIG. 4).

In this manner, the image capturing unit 11 acquires both the visible light image 100 and the fluorescence image 101 regarding the biological tissue 200 to be observed.

The image capturing unit 11 illustrated in FIG. 1 includes a camera controller 21, a camera storage unit 22, an imaging unit 23, a light irradiation unit 24, and a sample support unit 25.

The camera controller 21 controls components of the image capturing unit 11.

The camera storage unit 22 stores various data and a program. The components of the image capturing unit 11 (for example, the camera controller 21) can appropriately read, rewrite and update, and delete the various data and program in the camera storage unit 22.

The sample support unit 25 supports a sample of the biological tissue 200 to be observed while arranging the sample at a predetermined observation position under the control of the camera controller 21. The arrangement of the sample of the biological tissue 200 at the observation position may be manually performed or mechanically performed by a transport device (not illustrated).

The sample of the biological tissue 200 supported by the sample support unit 25 includes the phosphor 202 labeled with a fluorescence reagent (for example, indocyanine green (ICG), 5-ALA, or fluorescein).

In the present embodiment, a case where only one phosphor 202 is included in the biological tissue 200 to be observed is assumed, but the biological tissue 200 may include two or more phosphors 202 as described later.

The light irradiation unit 24 irradiates the biological tissue 200 positioned at the observation position with imaging light (that is, visible light and excitation light) under the control of the camera controller 21.

The light irradiation unit 24 includes a visible light irradiation unit 24a and an excitation light irradiation unit 24b. The visible light irradiation unit 24a emits visible light (in particular, white light) toward the observation position. The excitation light irradiation unit 24b emits excitation light for fluorescently exciting the phosphor 202 toward the observation position.

In a case where there is a possibility that a plurality of types of fluorescence reagents having different excitation wavelengths is used to fluoresce a target site, the excitation light irradiation unit 24b can emit a plurality of types of excitation light having those excitation wavelengths. In this case, the excitation light irradiation unit 24b can selectively emit excitation light having a wavelength corresponding to a fluorescence reagent to be actually used.

The visible light irradiation unit 24a and the excitation light irradiation unit 24b may be configured by separate devices, or may be partially or entirely configured by a common device.

Under the control of the camera controller 21, the imaging unit 23 images the biological tissue 200 positioned at the observation position to acquire captured images (that is, the visible light image 100 and the fluorescence image 101).

The imaging unit 23 includes a visible light imaging unit 23a and an excitation light imaging unit 23b. The visible light imaging unit 23a acquires the visible light image 100 of the biological tissue 200. The excitation light imaging unit 23b acquires the fluorescence image 101 of the biological tissue 200.

The visible light imaging unit 23a and the excitation light imaging unit 23b may be configured by separate devices, or may be partially or entirely configured by a common device.

The visible light image 100 and the fluorescence image 101 of the biological tissue 200 acquired in this manner are transmitted from the image capturing unit 11 to the medical image processing apparatus 12 under the control of the camera controller 21.

A specific transmission method of the visible light image 100 and the fluorescence image 101 from the image capturing unit 11 to the medical image processing apparatus 12 is not limited. The visible light image 100 and the fluorescence image 101 may be directly transmitted from the imaging unit 23 to the medical image processing apparatus 12 immediately after imaging, or may be transmitted from a device other than the imaging unit 23 (for example, the camera controller 21) to the medical image processing apparatus 12. For example, the visible light image 100 and the fluorescence image 101 may be once stored in the camera storage unit 22, then read from the camera storage unit 22, and transmitted to the medical image processing apparatus 12.

The medical image processing apparatus 12 analyzes the captured images (in particular, the fluorescence image 101) of the biological tissue 200 to acquire depth position information on the phosphor 202. In addition, the medical image processing apparatus 12 generates an observation image on the basis of the visible light image 100 and the fluorescence image 101.

In the observation image of the present embodiment, a location of the phosphor 202 in the biological tissue 200 is visually recognizable. However, a specific image and other information included in the observation image are not limited.

Details of a functional configuration example and an image processing example of the medical image processing apparatus 12 will be described later.

The output unit 13 includes an output controller 31, an output storage unit 32, and a display device 33.

The output controller 31 controls components of the output unit 13.

The output storage unit 32 stores various data and a program. The components of the output unit 13 (for example, the output controller 31) can appropriately read, rewrite and update, and delete the various data and program in the output storage unit 32.

The display device 33 displays the observation image sent from the medical image processing apparatus 12. An observer such as an operator and the like can confirm a range of the phosphor 202 in the biological tissue 200 by viewing the observation image displayed on the display device 33.

[Medical Image Processing Apparatus]

Next, a functional configuration example and an image processing example of the medical image processing apparatus 12 will be described.

The medical image processing apparatus 12 illustrated in FIG. 2 includes an image processing controller 40, an image acquisition unit 41, a depth position information acquisition unit 42, an image quality adjustment unit 43, an observation image generation unit 44, and a processing storage unit 45. These functional units included in the medical image processing apparatus 12 can be configured by arbitrary hardware and/or software, and two or more functional units may be realized by a common processing unit.

The image acquisition unit 41 acquires the visible light image 100 and the fluorescence image 101 of the biological tissue 200 (including the phosphor 202) from the image capturing unit 11.

The image acquisition unit 41 may directly send the acquired visible light image 100 and fluorescence image 101 to the other processing units (the image processing controller 40, the depth position information acquisition unit 42, the image quality adjustment unit 43, and the observation image generation unit 44), or may temporarily store them in the processing storage unit 45. The other processing units (the image processing controller 40, the depth position information acquisition unit 42, the image quality adjustment unit 43, and the observation image generation unit 44) of the medical image processing apparatus 12 may acquire the visible light image 100 and the fluorescence image 101 from the processing storage unit 45 as necessary.

The depth position information acquisition unit 42 acquires depth position information related to a depth position of the phosphor 202 on the basis of the fluorescence image 101. That is, the depth position information acquisition unit 42 derives the depth position information on the phosphor 202 on the basis of a degree of blurring of the phosphor 202 in the fluorescence image 101.

The depth position information mentioned here is information associated with the depth position of the phosphor 202, and is typically information directly indicating the depth position of the phosphor 202 (for example, an absolute value of a distance (depth) from a tissue surface 200a). However, the depth position information may be information indirectly indicating the depth position of the phosphor 202, or may be different information derived from the depth position and other information.

The depth position information acquisition unit 42 of the present embodiment analyzes the fluorescence image 101 to acquire spread information indicating an image intensity distribution of the phosphor 202 in the fluorescence image 101. Then, the depth position information acquisition unit 42 acquires the depth position information on the phosphor 202 by collating the spread information on the phosphor 202 with a spread function representing an image intensity distribution in the biological tissue 200.

The spread information on the phosphor 202 indicates an actual degree of blurring of the phosphor 202 in the fluorescence image 101. The blurring of the phosphor 202 in the fluorescence image 101 is caused by light scattering in the biological tissue 200, and thus varies depending on the depth position of the phosphor 202. On the other hand, the spread function is a function in which a degree of blurring of the phosphor 202 in the fluorescence image 101 is formulated according to the depth position of the phosphor 202.

Therefore, the depth position information acquisition unit 42 derives the depth position of the phosphor 202 by collating the spread information indicating the actual degree of blurring of the phosphor 202 with the formulated spread function.

Figure 6:
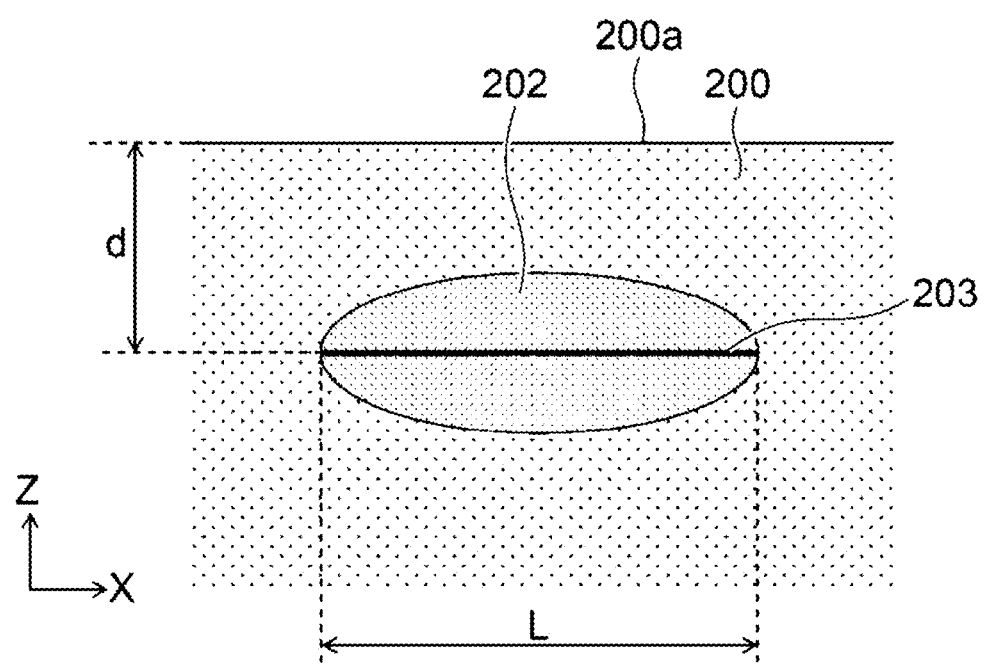
FIG. 6 is a cross-sectional view of an example of the biological tissue along an XZ plane.
Figure 7:
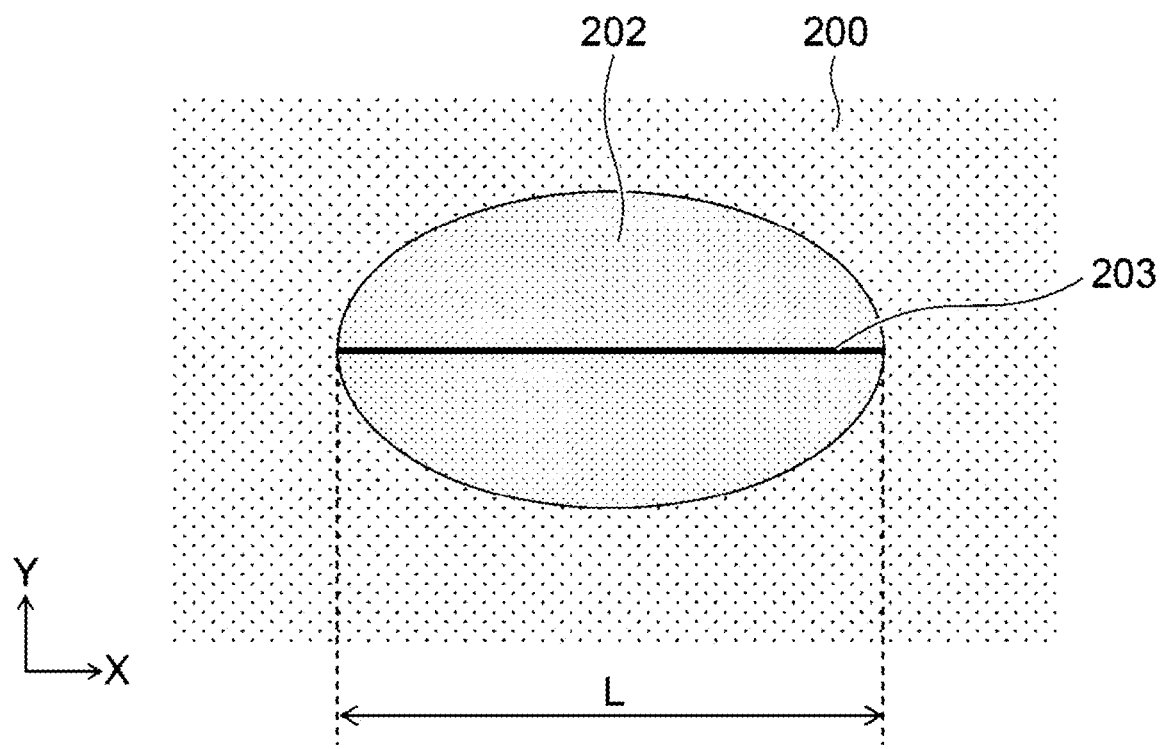
FIG. 7 is a cross-sectional view of the biological tissue illustrated in FIG. 6 along an XY plane.
Figure 8:
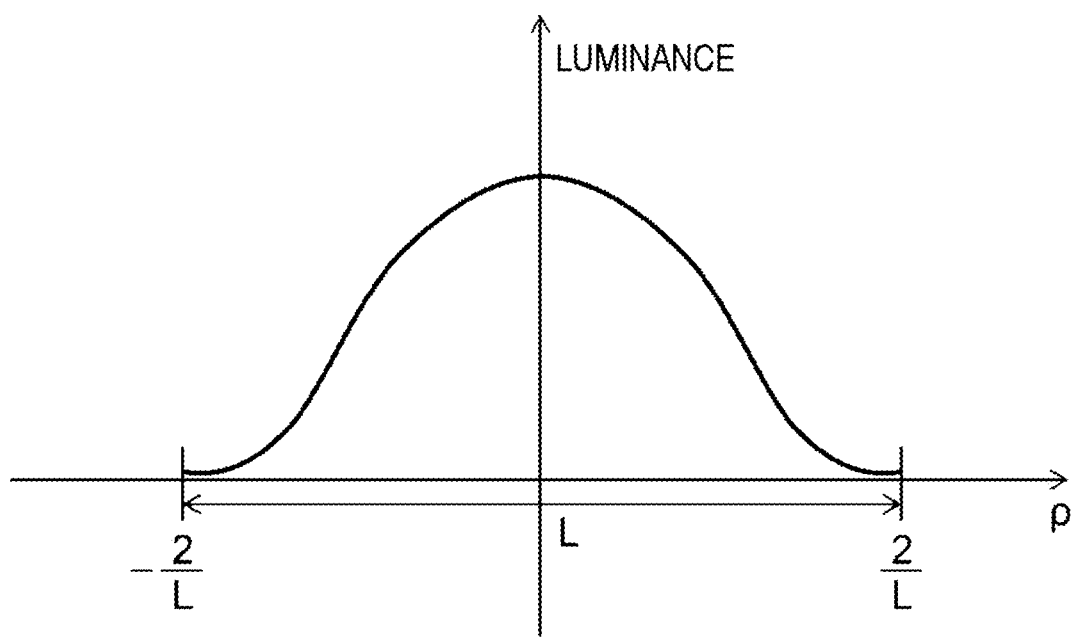
FIG. 8 illustrates an example of a function obtained by approximation (that is, an approximate function) of a one-dimensional luminance distribution along an observation reference line of a phosphor on the basis of a Gaussian function.

FIG. 6 is a cross-sectional view of an example of the biological tissue 200 along an XZ plane. FIG. 7 is a cross-sectional view of the biological tissue 200 illustrated in FIG. 6 along an XY plane. FIG. 8 illustrates an example of a function obtained by approximation (that is, an approximate function) of a one-dimensional luminance distribution along an observation reference line 203 of the phosphor 202 on the basis of a Gaussian function. "X axis", "Y axis", and "Z axis" form a right angle with each other, and a direction along the Z axis (that is, a Z-axis direction) indicates a depth direction.

As illustrated in FIG. 6, fluorescence emitted from the phosphor 202 located at a depth represented by "d" from a surface (that is, "tissue surface") 200a of the biological tissue 200 is scattered by the biological tissue 200 before reaching the tissue surface 200a. As a result, a fluorescence image of the phosphor 202 observed on the tissue surface 200a is blurred and becomes larger than actual size of the phosphor 202 (see FIG. 7).

Therefore, in the fluorescence image 101, the phosphor 202 appears in a range wider than an actual range.

The depth position information acquisition unit 42 acquires, as "spread information", information on "range of the phosphor 202 in the fluorescence image 101" wider than the actual range of the phosphor 202.

Typically, a one-dimensional luminance distribution of the phosphor 202 in the fluorescence image 101 can be acquired as "spread information on the phosphor 202". The depth position information acquisition unit 42 of the present embodiment analyzes a luminance distribution of the fluorescence image 101 to acquire a one-dimensional luminance distribution related to a linear portion (that is, an observation reference line 203) of the phosphor 202 having a length L along an X-axis direction illustrated in FIG. 7. Note that, in the examples illustrated in FIGS. 6 and 7, a linear portion having the maximum length in the X-axis direction of the phosphor 202 is set as the observation reference line 203.

The depth position information acquisition unit 42 of the present embodiment approximates the spread information on the phosphor 202 acquired in this manner with reference to a statistically modeled function (for example, a probability distribution function such as a Gaussian function or a Lorentz function) to acquire an approximate function.

By using the approximate function (see FIG. 8) thus obtained as "spread information on the phosphor 202", collation between the spread information and the spread function (particularly, a line spread function) can be simplified, and a processing load can be reduced.

On the other hand, the spread function is typically expressed by a point spread function (PSF) that is a response function related to a point light source or a line spread function (LSF) that is a response function related to a line light source. Since the actual phosphor 202 has a length, the line spread function is used as the spread function in the present embodiment.

The point spread function (PSF(ρ)) and the line spread function (LSF(ρ)) are expressed by, for example, the following formulas.

[Math. 1]

$$PSF(\rho) = \frac{3}{(4\pi)^2} \left\{ (\mu_s' + \mu_a) + \left( \kappa_d + \frac{1}{\sqrt{\rho^2 + d^2}} \right) \frac{d}{\sqrt{\rho^2 + d^2}} \right\} \times \frac{e^{-\kappa_d \sqrt{\rho^2 + d^2}}}{\sqrt{\rho^2 + d^2}}$$

FORMULA 1

[Math. 2]

$$\kappa_d^2 = 3\mu_a(\mu_s' + \mu_a)$$

FORMULA 2

[Math. 3]

$$LSF(\rho) = \int_{-\frac{L}{2}}^{\frac{L}{2}} PSF(\rho)$$

FORMULA 3

[Math. 4]

$$d = f(\rho)$$

FORMULA 4

In the formulas 1 to 4 regarding the point spread function (PSF(ρ)) and the line spread function (LSF(ρ)) described above, "ρ" represents a position in a plane (that is, the XY plane) perpendicular to the depth direction (the Z-axis direction).

"d" represents a depth position of the phosphor 202 (that is, a position in the depth direction from the tissue surface 200a to the phosphor 202 (in particular, the observation reference line 203)).

"$\mu_a$" represents an absorption coefficient, and is determined according to a type of the biological tissue 200 (for example, an organ such as a liver and the like; more specifically, a medium (composition) constituting the biological tissue 200).

"$\mu_s'$" represents an equivalent scattering coefficient, and is determined according to the type of the biological tissue 200 and a fluorescence wavelength of the phosphor 202.

Note that, since a wavelength of excitation light and the fluorescence wavelength of the phosphor 202 have a predetermined correspondence relationship, "$\mu_s'$" can be determined in association with the wavelength of the excitation light. A difference between the excitation wavelength and the fluorescence wavelength is small for most of the fluorescence reagents, and the difference between the excitation wavelength and the fluorescence wavelength may be substantially ignored with respect to the degree of blurring of the phosphor 202. In such a case, the excitation wavelength can be regarded as the fluorescence wavelength, and "$\mu_s'$" can be determined in association with the excitation wavelength. Furthermore, in a case where there is a possibility of using a plurality of fluorescence reagents and a fluorescence wavelength of each fluorescence reagent is uniquely determined, "$\mu_s'$" can be determined in association with the fluorescence reagent. In this case, "$\mu_s'$" is indirectly associated with the fluorescence wavelength.

As described above, specific values of "$\mu_a$" and "$\mu_s'$" can be acquired in advance and stored in a database. The processing storage unit 45 of the present embodiment stores a large number of "$\mu_a$" data in advance in association with the types of the biological tissues 200. Similarly, the processing storage unit 45 stores a large number of "$\mu_s'$" data in advance in association with the types of the biological tissues 200 and the fluorescence wavelengths of the phosphors 202.

Therefore, the specific value of "$\mu_a$" can be read from the processing storage unit 45 according to an actual type of the biological tissue 200. Similarly, the specific value of "$\mu_s'$" can be read from the processing storage unit 45 according to the actual type of the biological tissue 200 and an actual fluorescence wavelength of the phosphor 202.

"L" represents a length of the phosphor 202 in the XY plane perpendicular to the depth direction (see FIG. 7). In the present embodiment, "L" is represented by the length in the X-axis direction of the observation reference line 203 representing the phosphor 202.

"$K_d$" is determined on the basis of the absorption coefficient ($\mu_a$) and the equivalent scattering coefficient ($\mu_s'$) as expressed by the formula 2 described above.

As is clear from the formulas 1 to 4 described above, the spread functions (that is, the point spread function "PSF(ρ)" and the line spread function "LSF(ρ)") include "d", "$\mu_a$", "$\mu_s'$", and "L" as parameters. Therefore, when "$\mu_a$", "$\mu_s'$", and "L" are determined to be specific values, the spread functions are expressed as a function of "d", and as shown in the formula 4 described above, the depth position "d" of the phosphor 202 can be expressed by a function ("f(ρ)") of the position "ρ" of the phosphor 202 in the XY plane.

The depth position information acquisition unit 42 of the present embodiment acquires the length "L" of the phosphor 202 to be observed from "range of the phosphor 202 in the fluorescence image 101" specified by analyzing the fluorescence image 101. In addition, the depth position information acquisition unit 42 reads and acquires the corresponding "$\mu_a$" and "$\mu_s'$" from the processing storage unit 45 according to the type of the biological tissue 200 and the fluorescence wavelength of the phosphor 202. Then, the depth position information acquisition unit 42 acquires "LSF(ρ)" reflecting the corresponding values of "L", "$\mu_a$", and "$\mu_s'$", and derives "f(ρ)" on the basis of "LSF(ρ)".

Note that the depth position information acquisition unit 42 can acquire the type of the biological tissue 200 and the fluorescence wavelength of the phosphor 202 by an arbitrary method.

The depth position information acquisition unit 42 of the present embodiment estimates the type of the biological tissue 200 by analyzing the visible light image 100, and determines the fluorescence wavelength of the phosphor 202 on the basis of the information transmitted from the image capturing unit 11. However, the depth position information acquisition unit 42 may acquire the type of the biological tissue 200 and the fluorescence wavelength of the phosphor 202 on the basis of information manually input to the medical observation system 10 (for example, the medical image processing apparatus 12) by an operator.

In this manner, the depth position information acquisition unit 42 acquires "line spread function based on the luminance distribution of and the depth position information on the phosphor 202" determined according to the type of the biological tissue 200 as "spread function based on the depth position of the phosphor 202". Then, the depth position information acquisition unit 42 derives the depth position information on the phosphor 202 on the basis of the line spread information (approximate function) based on the luminance of the phosphor 202 and the line spread function.

The image quality adjustment unit 43 (see FIG. 2) performs sharpening processing according to the depth position information on the phosphor 202 on the fluorescence image 101.

A specific method of the sharpening processing is not limited. Typically, sharpening processing using an inverse function of a spread function indicating a degree of blurring of the phosphor 202 is performed, and an image restoration filter derived from the spread function described above is applied to the fluorescence image 101.

The image quality adjustment unit 43 may perform other sharpening processing on the fluorescence image 101, or may perform arbitrary image quality adjustment processing on the visible light image 100 and/or the fluorescence image 101.

The observation image generation unit 44 generates an observation image 103. The observation image 103 is not limited as long as a location of the phosphor 202 in the biological tissue 200 is visually recognizable.

Figure 9:
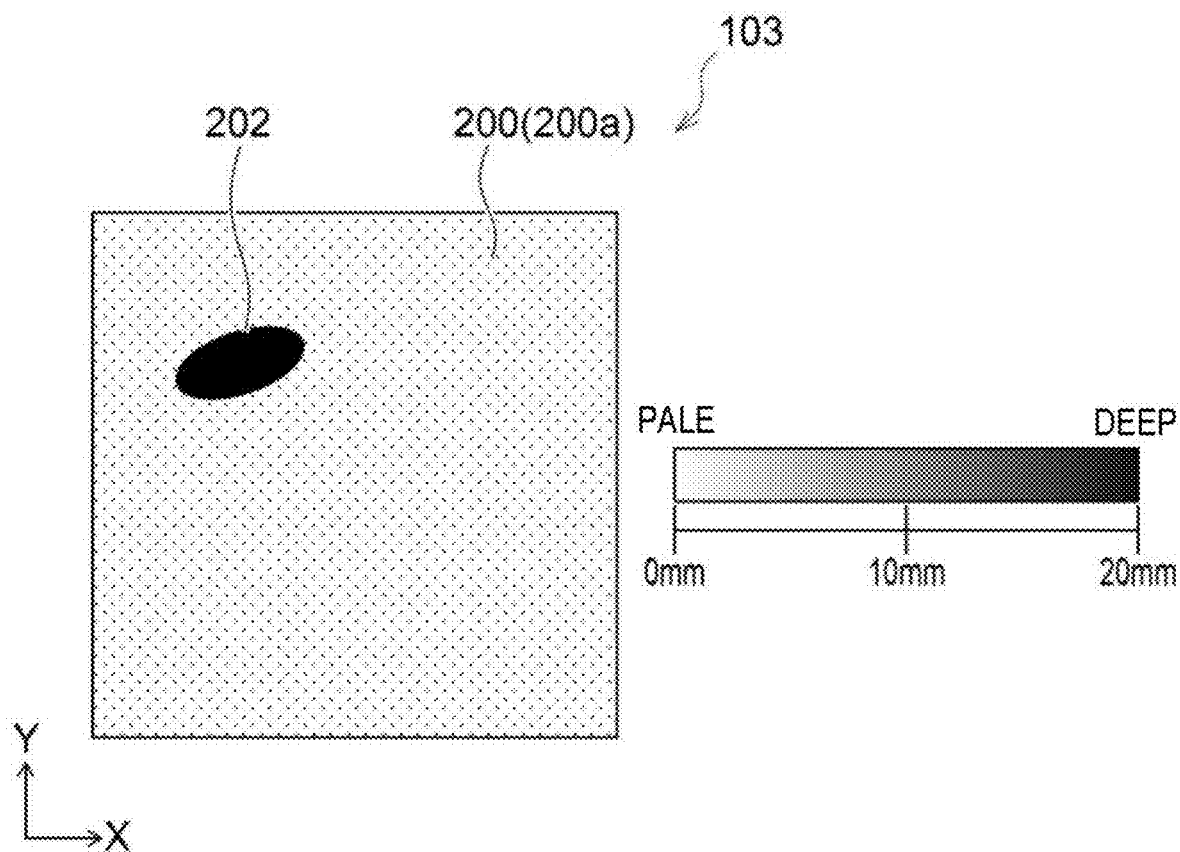
FIG. 9 is a diagram illustrating an example of an observation image according to a first embodiment.
Figure 10:
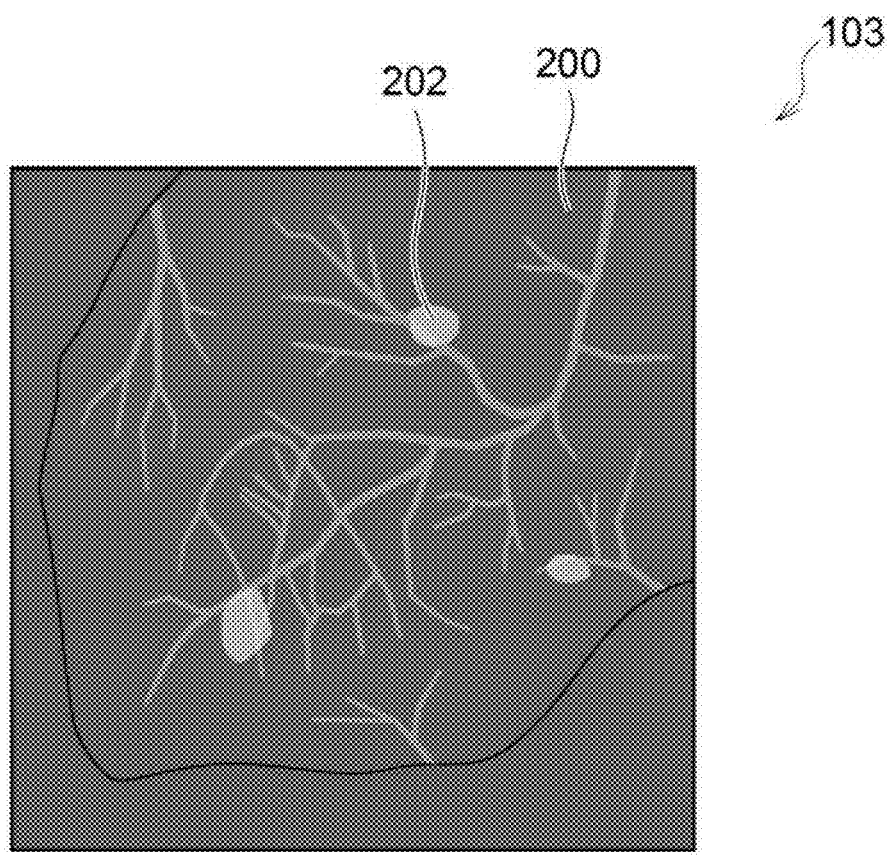
FIG. 10 is a diagram illustrating another example of the observation image according to the first embodiment.

FIG. 9 is a diagram illustrating an example of the observation image 103 according to the first embodiment. FIG. 10 is a diagram illustrating another example of the observation image 103 according to the first embodiment.

As an example, the observation image generation unit 44 can generate the observation image 103 by emphasizing a portion corresponding to the range of the phosphor 202 in the visible light image 100 (see FIG. 9).

In particular, in the fluorescence image 101 subjected to the sharpening processing, blurring of the phosphor 202 is reduced, and a more accurate range of the phosphor 202 appears. Therefore, the observation image generation unit 44 can more accurately specify the range of the phosphor 202 in the biological tissue 200 by analyzing the fluorescence image 101 subjected to the sharpening processing. Then, the observation image generation unit 44 can generate the observation image 103 by performing processing of emphasizing a corresponding portion of the range of the phosphor 202 in the visible light image 100.

In this case, an observer observing the observation image 103 can clearly confirm the range of the phosphor 202 on the visible light image 100.

As another example, the observation image generation unit 44 can generate the observation image 103 by superimposing a portion corresponding to the phosphor 202 of the fluorescence image 101 subjected to the sharpening processing on a corresponding portion of the visible light image 100 (see FIG. 10).

In this case, the observer observing the observation image 103 can visually recognize a fluorescence state of the phosphor 202 on the visible light image 100. Note that the observation image generation unit 44 may generate the observation image 103 by superimposing the fluorescence image 101 of the phosphor 202 subjected to image processing (for example, color, shading, and brightness adjustment processing) on the visible light image 100.

Information directly or indirectly indicating the depth position information on the phosphor 202 may be reflected in the observation image 103 (see FIG. 9). In this case, the observer of the observation image 103 can intuitively grasp the depth position information on the phosphor 202.

The information indicating the depth position information on the phosphor 202 can be reflected in the observation image 103 in an arbitrary form. For example, in the observation image 103, a portion corresponding to the range of the phosphor 202 may be emphasized according to the depth position information. As an example, the observation image generation unit 44 may adjust color, a pattern, shading, and/or brightness of a portion of the observation image 103 corresponding to the range of the phosphor 202 according to the depth position information on the corresponding phosphor 202.

In this case, an indicator display indicating a relationship between highlighting of the phosphor 202 and the depth position information on the phosphor 202 may be included in the observation image 103. In the example illustrated in FIG. 9, the depth position of the phosphor 202 is represented by the shading of the filling of the phosphor 202, and a bar-shaped indicator display indicating a relationship between shading display and a depth position (that is, a distance (0 mm to 20 mm) from the tissue surface 200*a*) is included in the observation image 103.

Moreover, imaging conditions of the visible light image 100 and/or the fluorescence image 101 of the biological tissue 200 may be optimized according to the depth position information on the phosphor 202. That is, the image capturing unit 11 illustrated in FIG. 1 may adjust the imaging conditions on the basis of "depth position information on the phosphor 202" transmitted from the medical image processing apparatus 12. In this case, the image capturing unit 11 may adjust, for example, a driving condition of a camera (including an imaging element) and a state of imaging light (for example, brightness of excitation light and/or visible light) with which the biological tissue 200 is irradiated.

Next, an example of a medical image processing method using the medical observation system 10 (particularly, the medical image processing apparatus 12) will be described.

Figure 11:
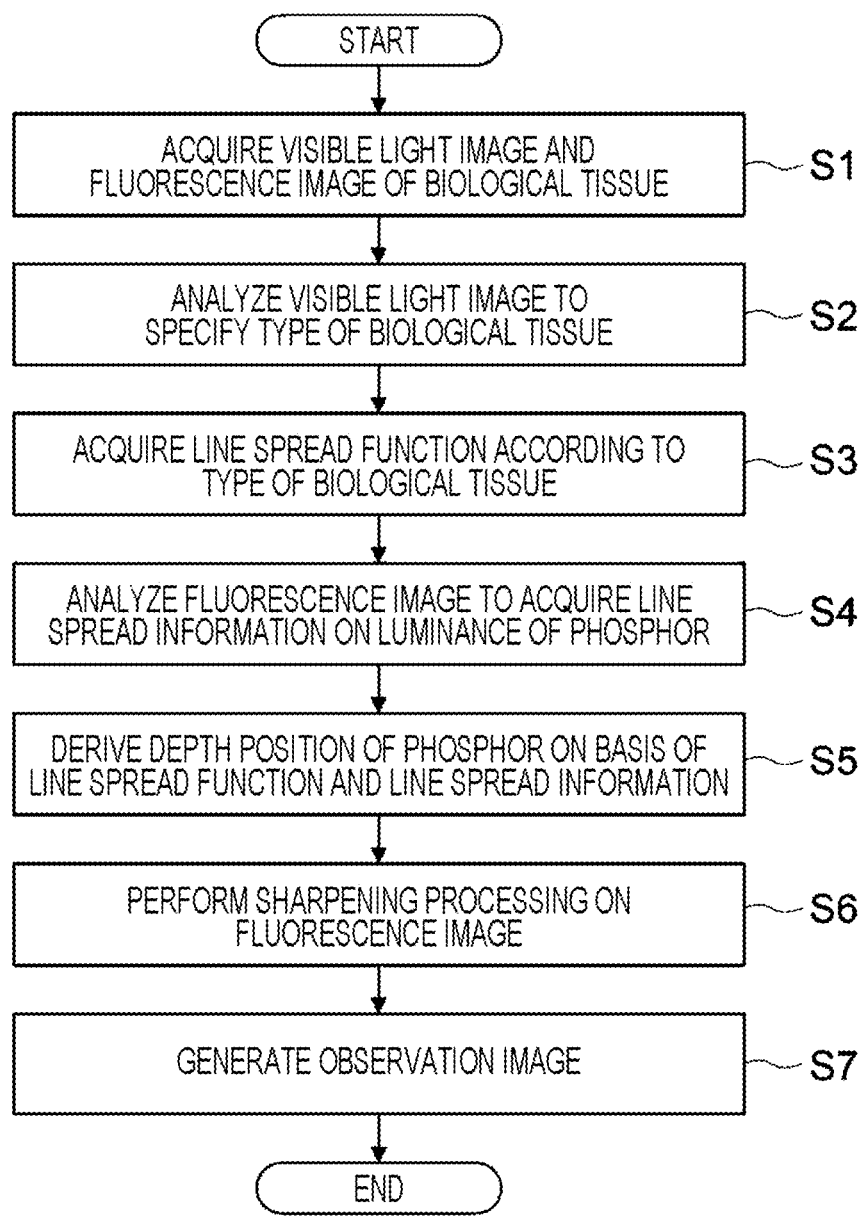
FIG. 11 is a flowchart illustrating an example of a medical image processing method according to the first embodiment.

FIG. 11 is a flowchart illustrating the example of the medical image processing method according to the first embodiment.

First, the visible light image 100 and the fluorescence image 101 of the biological tissue 200 are acquired from the image capturing unit 11 by the image acquisition unit 41 of the medical image processing apparatus 12 (S1 in FIG. 11).

Then, the depth position information acquisition unit 42 analyzes the visible light image 100 to specify a type of the biological tissue 200 (S2). A specific analysis method of the visible light image 100 for specifying the type of the biological tissue 200 is not limited, and the type of the biological tissue 200 can be specified by using a known image processing method.

Then, the depth position information acquisition unit 42 acquires a line spread function according to the type of the biological tissue 200 (S3). As described above, the depth position information acquisition unit 42 of the present embodiment acquires the line spread function reflecting the corresponding absorption coefficient and equivalent scattering coefficient read from the processing storage unit 45 and the length L of the phosphor 202 (in particular, the observation reference line 203).

Then, the depth position information acquisition unit 42 analyzes the fluorescence image 101 and acquires line spread information regarding luminance of the phosphor 202 in the fluorescence image 101 (S4). A specific analysis method of the fluorescence image 101 for acquiring the line spread information on the phosphor 202 is not limited, and it is possible to acquire the line spread information on the phosphor 202 (luminance distribution regarding the observation reference line 203 of the phosphor 202) by using a known image processing method.

Then, the depth position information acquisition unit 42 collates the line spread information on the phosphor 202 with the line spread function to derive a depth position of the phosphor 202 (S5).

Then, the image quality adjustment unit 43 performs sharpening processing (that is, light scattering suppression processing) optimized on the basis of the depth position of the phosphor 202 on the fluorescence image 101 (S6). Therefore, it is possible to obtain the clear fluorescence image 101 of the phosphor 202 with suppressed blurring, and to bring a range of the phosphor 202 in the fluorescence image 101 close to an actual range of the phosphor 202.

Then, the observation image generation unit 44 generates the observation image 103 from the visible light image 100 and the fluorescence image 101 (in particular, the fluorescence image 101 after the sharpening processing) (S7).

Note that the image quality adjustment unit 43 and the observation image generation unit 44 may perform arbitrary image processing to adjust states of image quality and the like of the visible light image 100, the fluorescence image 101, and/or the observation image 103 of the biological tissue 200.

Thereafter, the observation image 103 is sent from the medical image processing apparatus 12 to the output unit 13 and displayed on the display device 33. In addition, information indicating the depth position of the phosphor 202 is sent from the medical image processing apparatus 12 to the image capturing unit 11 as necessary.

As described above, according to the present embodiment, the depth position of the phosphor 202 can be acquired on the basis of the degree of image blurring of the phosphor 202 in the fluorescence image 101.

Therefore, the depth position can be appropriately acquired not only for the phosphor 202 appearing in the visible light image 100 but also for the phosphor 202 not appearing in the visible light image 100 (for example, the phosphor 202 positioned in a deep portion of the biological tissue 200). Furthermore, it is possible to acquire the depth position of the phosphor 202 in the biological tissue 200 without providing a special device.

Furthermore, image processing (the sharpening processing or the like) optimized for the depth position of the phosphor 202 can be performed.

Therefore, visibility of the phosphor 202 in the fluorescence image 101 can be improved, and a more accurate range of the phosphor 202 in the biological tissue 200 can be specified. Furthermore, by generating the observation image 103 on the basis of such a fluorescence image 101, an observer such as an operator and the like can easily and accurately grasp a state of the phosphor 202 in the biological tissue 200 from the observation image 103.

As a result, the operator can perform surgery (for example, endoscopic surgery) with a more accurate procedure, and it is possible to effectively reduce cancer and the like left behind or damage to normal tissues in surgery.

Second Embodiment

In a second embodiment described below, the same or corresponding elements as those in the first embodiment described above are denoted by the same reference numerals, and a detailed description thereof will be omitted.

In the present embodiment, a case where the biological tissue 200 includes a plurality of phosphors 202 having different fluorescence wavelengths is assumed. For example, two or more types of fluorescence reagents are used to label one or more types of tissues (phosphors 202), and two or more types of phosphors 202 having mutually different fluorescence wavelengths are included in the biological tissue 200 to be observed.

In the following description, in a case where a plurality of phosphors is collectively referred without being distinguished from each other in type, they are simply referred to as "phosphor 202".

Figure 12:
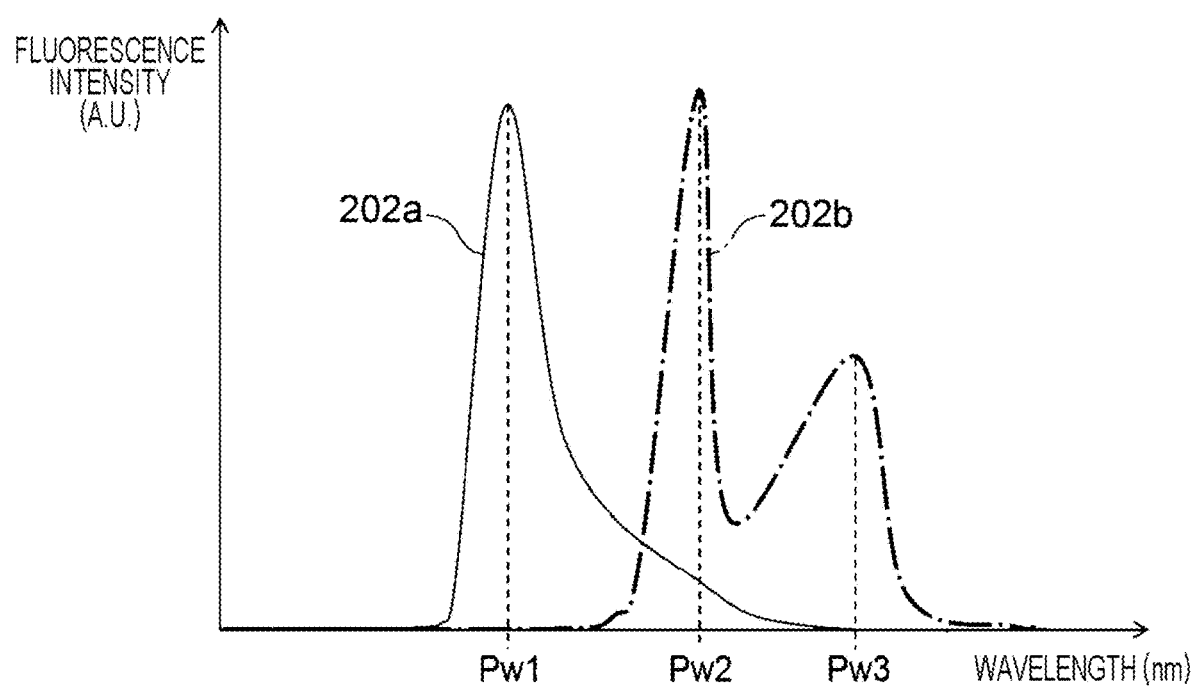
FIG. 12 illustrates an example of a relationship between a wavelength (horizontal axis) and fluorescence intensity (vertical axis) of two types of phosphors (that is, a first phosphor and a second phosphor).

FIG. 12 illustrates an example of a relationship between a wavelength (horizontal axis) and fluorescence intensity (vertical axis) of two types of phosphors 202 (that is, a first phosphor 202a and a second phosphor 202b).

The first phosphor 202a and the second phosphor 202b shown in FIG. 12 are excited in mutually different wavelength ranges, and their peak fluorescence wavelengths (that is, fluorescence wavelengths showing the maximum fluorescence intensity) are different from each other. Specifically, a peak fluorescence wavelength Pw1 of the first phosphor 202a is shorter than peak fluorescence wavelengths Pw2, Pw3 of the second phosphor 202b.

By causing the plurality of types of phosphors 202 to fluoresce using the plurality of types of fluorescence reagents in this manner, it is possible to simultaneously represent the plurality of types of phosphors 202 in a state of being distinguished from each other in one observation image 103. An observer such as an operator and the like can simultaneously observe the plurality of types of phosphors 202 in such an observation image 103 while distinguishing them from each other.

Such simultaneous observation of the plurality of types of phosphors 202 can be applied to various applications, and it is expected that a need in the field of surgery and the like will increase more and more in the future.

Hereinafter, an application example of the simultaneous observation of the plurality of types of phosphors 202 will be described.

As a first application example, there is an application in which different portions in the biological tissue 200 are labeled with different fluorescence reagents. For example, there is a case where identification of a liver region and identification of a liver cancer region are performed separately in hepatobiliary surgery.

In a case where both the liver region and the liver cancer region are caused to fluoresce using one type of fluorescence reagent, it is not clear whether a boundary of a fluorescent portion indicates a boundary between the liver region and the liver cancer region.

On the other hand, the liver region can be labeled with a first fluorescence reagent, and the liver cancer region can be labeled with a second fluorescence reagent having a fluorescence wavelength (particularly, a peak fluorescence wavelength) different from that of the first fluorescence reagent. In this case, the observer such as the operator and the like can grasp each of the liver region (first phosphor 202a) and the liver cancer region (second phosphor 202b) from the fluorescence image while clearly distinguishing a boundary therebetween. Therefore, the operator can more accurately grasp a position and a range of the liver cancer region in the entire liver, and can appropriately remove the liver cancer while suppressing expansion of a tissue resection range.

As a second application example, there is an application in which one portion in the biological tissue 200 is labeled with different fluorescence reagents. For example, there is a case where a state of blood flow before and after surgery is observed.

Figure 13:
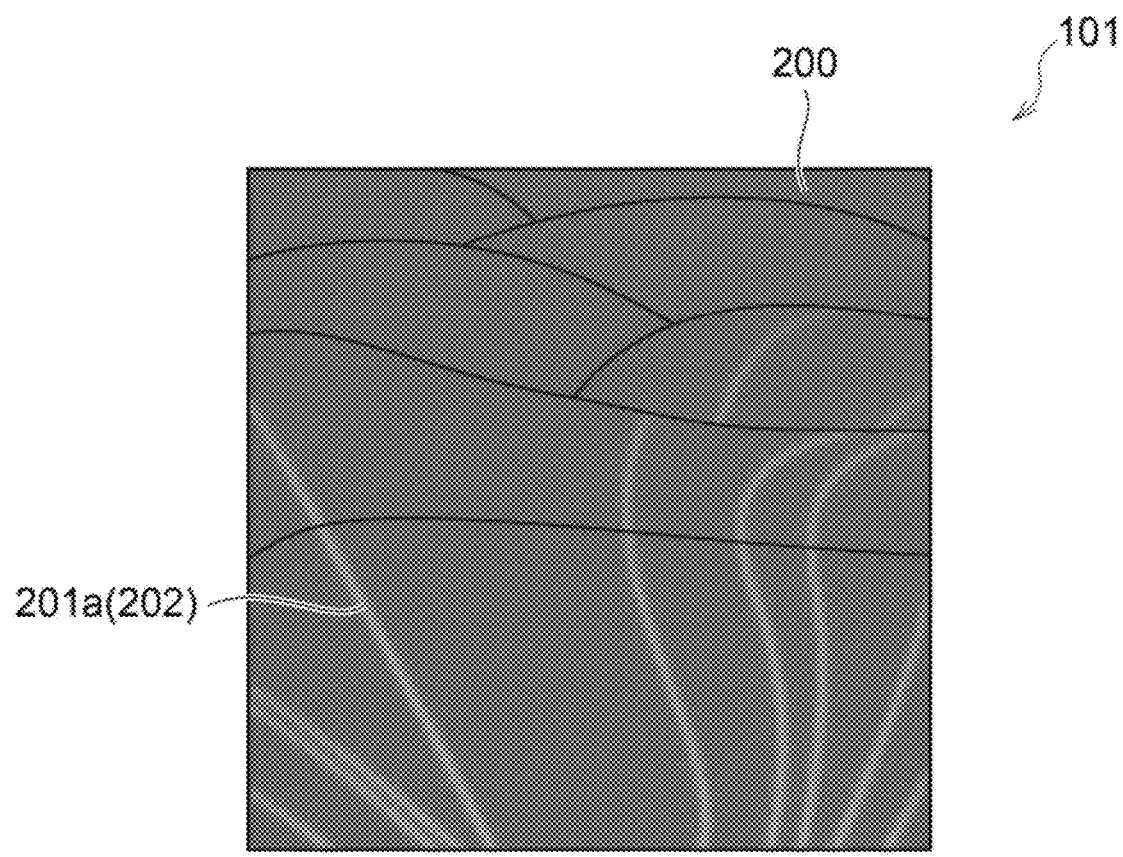
FIG. 13 illustrates an example of a fluorescence image of a biological tissue captured before surgery in a state where a first fluorescence reagent is mixed in blood.
Figure 14:
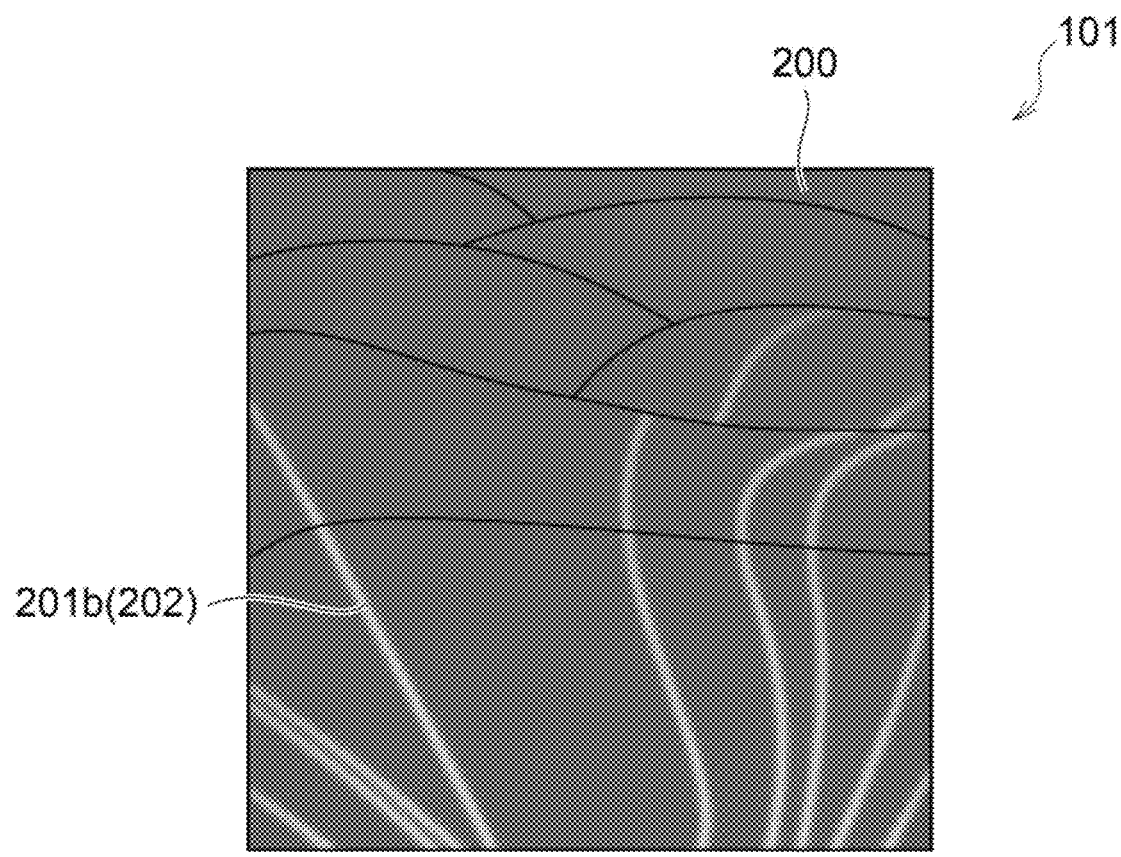
FIG. 14 illustrates an example of the fluorescence image of the biological tissue captured after the surgery in a state where a second fluorescence reagent different from the first fluorescence reagent is mixed in the blood.

FIG. 13 illustrates an example of the fluorescence image 101 of the biological tissue 200 captured before surgery in a state where the first fluorescence reagent is mixed in blood. FIG. 14 illustrates an example of the fluorescence image 101 of the biological tissue 200 captured after the surgery in a state where the second fluorescence reagent different from the first fluorescence reagent is mixed in the blood.

A fluorescence reagent mixed in blood before surgery may remain in a blood vessel (particularly, an observation target site) even after the surgery. Therefore, in a case where the fluorescence reagent mixed in the blood before the surgery is the same as the fluorescence reagent mixed in the blood after the surgery, it cannot be determined whether fluorescence observed after the surgery is due to the fluorescence reagent administered before the surgery or due to the fluorescence reagent administered after the surgery.

On the other hand, in a case where a fluorescence wavelength of the first fluorescence reagent mixed in the blood before the surgery is different from a fluorescence wavelength of the second fluorescence reagent mixed in the blood after the surgery, fluorescence emitted from the second fluorescence reagent (see FIG. 14) can be clearly distinguished from fluorescence emitted from the first fluorescence reagent (see FIG. 13). Therefore, a state of blood flow after the surgery can be quickly and appropriately observed from the fluorescence image 101 without performing removing treatment (that is, cleaning treatment) of the first fluorescence reagent from the observation target site before mixing the second fluorescence reagent into the blood.

From the viewpoint of meeting the need for simultaneous observation of the plurality of types of phosphors 202 as described above, it is preferable to change display of the plurality of phosphors 202 in the observation image 103 according to the type of phosphor 202 (that is, the type of fluorescence reagent).

In a case where the observation image 103 is generated by superimposing the fluorescence image 101 on the visible light image 100, when there is a large difference in brightness between the plurality of types of phosphors 202 in the fluorescence image 101, it is difficult to visually recognize the phosphors 202 in the fluorescence image 101 and the observation image 103.

Therefore, by adjusting brightness of a portion corresponding to each phosphor 202 in the fluorescence image 101 according to the type of the phosphor 202, it is possible to reduce the difference in brightness between the phosphors 202 and make the phosphors 202 easily viewable.

Furthermore, in a case where the first phosphor 202a and second phosphor 202b overlap each other in the fluorescence image 101, a relative depth positional relationship between the first phosphor 202a and the second phosphor 202b cannot be grasped from the fluorescence image 101. In particular, since the first phosphor 202a and the second phosphor 202b have different fluorescence wavelengths, a manner of scattering fluorescence in the biological tissue 200 is different from each other. Therefore, even if a degree of blurring in the fluorescence image 101 is simply compared between the first phosphor 202a and the second phosphor 202b, it is difficult to determine which one of the first phosphor 202a and the second phosphor 202b is located higher.

Therefore, according to the depth position of each phosphor 202, color, a pattern, shading, and/or brightness of display of each phosphor 202 in the observation image 103 may be adjusted according to depth position information on the corresponding phosphor 202. In this case, the depth position of each phosphor 202 can be grasped from the observation image 103, and the relative depth positional relationship between the phosphors 202 can be grasped therefrom.

In addition, in a case where the observation image 103 is generated by highlighting a corresponding range of the phosphor 202 in the visible light image 100, if all the phosphors 202 are similarly highlighted in the observation image 103 regardless of the type, the relative depth positional relationship between the phosphors 202 cannot be identified. Furthermore, even if the depth position information on each phosphor 202 is reflected in the observation image 103, in a case where all the phosphors 202 are similarly highlighted regardless of the type, the type of each phosphor 202 cannot be identified in the observation image 103.

Therefore, the display of each phosphor 202 in the observation image 103 may be emphasized according to both the depth position information and the type of the phosphor 202. In this case, both the depth position of each phosphor 202 and the type of each phosphor 202 can be grasped from the observation image 103. In addition, the relative depth positional relationship between the phosphors 202 and a relative depth positional relationship between the types of the phosphors 202 can be grasped from the observation image 103.

Next, an example of a medical image processing method using the medical observation system 10 (in particular, the medical image processing apparatus 12) of the second embodiment will be described.

Figure 15:
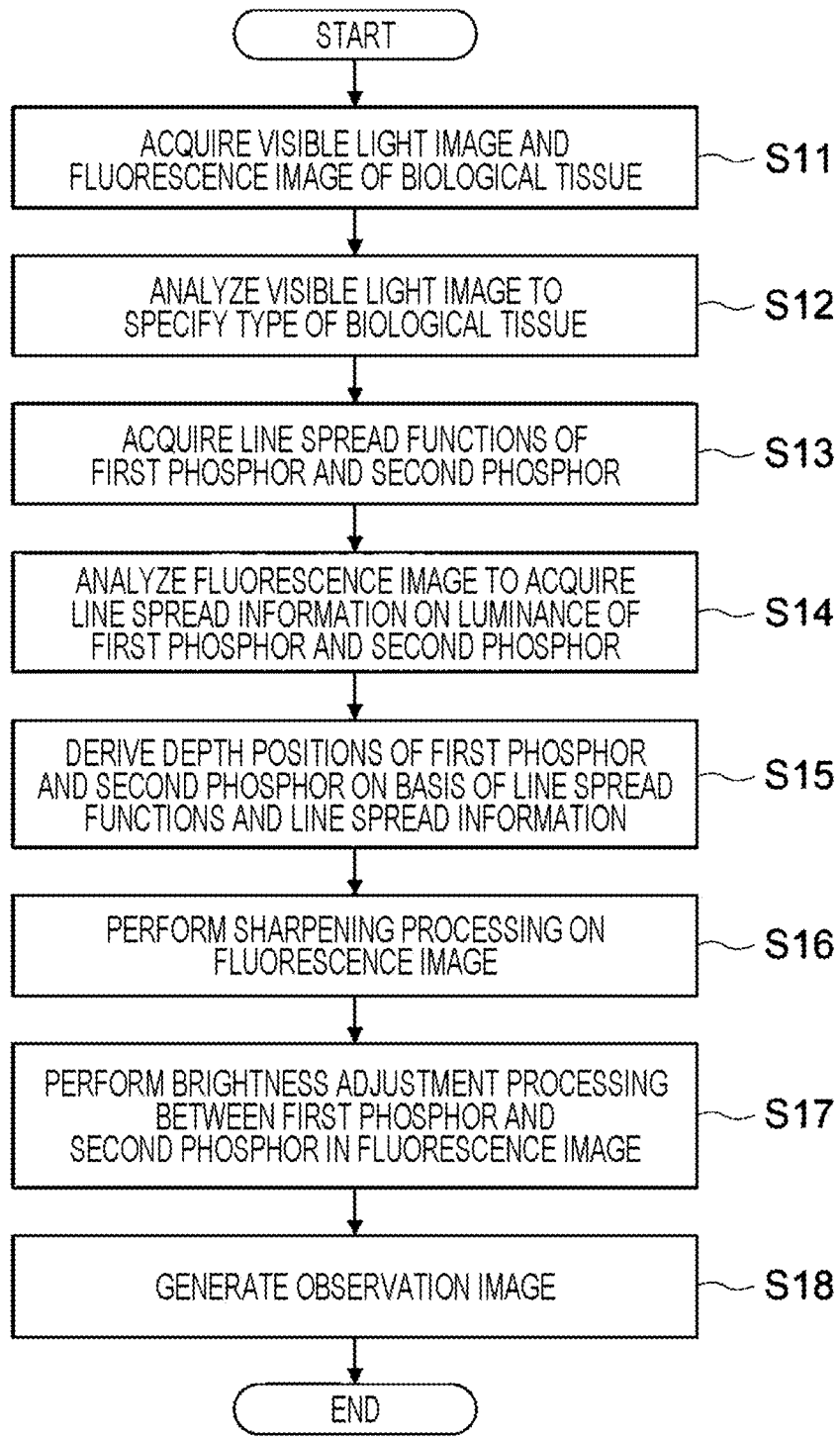
FIG. 15 is a flowchart illustrating an example of a medical image processing method according to a second embodiment.

FIG. 15 is a flowchart illustrating the example of the medical image processing method according to the second embodiment.

Hereinafter, a case where the biological tissue 200 includes the two phosphors 202 (the first phosphor 202a and the second phosphor 202b) will be described.

In the second embodiment, basically, the processing performed on the single phosphor 202 in the above-described first embodiment is performed on each of the plurality of phosphors 202 (the first phosphor 202a and the second phosphor 202b).

First, the visible light image 100 and the fluorescence image 101 of the biological tissue 200 are acquired from the image capturing unit 11 by the image acquisition unit 41 of the medical image processing apparatus 12 (S11 in FIG. 15).

The visible light image 100 of the biological tissue 200 is obtained by the image capturing unit 11 performing one visible light imaging.

On the other hand, the fluorescence image 101 of the biological tissue 200 may be obtained by the image capturing unit 11 performing one fluorescence imaging or may be obtained by performing a plurality of fluorescence imaging. In a case where both the first phosphor 202a and the second phosphor 202b can be appropriately excited by excitation light emitted at one time from the light irradiation unit 24 (particularly, the excitation light irradiation unit 24b) of the image capturing unit 11, the fluorescence image 101 can be obtained by one fluorescence imaging. On the other hand, in a case where both the first phosphor 202a and the second phosphor 202b cannot be appropriately excited by the excitation light emitted at one time from the excitation light irradiation unit 24b, the fluorescence image 101 of the first phosphor 202a and the fluorescence image 101 of the second phosphor 202b are obtained by separate fluorescence imaging.

Then, the depth position information acquisition unit 42 analyzes the visible light image 100 to specify a type of the biological tissue 200 (S12).

Then, the depth position information acquisition unit 42 acquires a line spread function according to the type of the biological tissue 200 (S13). The depth position information acquisition unit 42 according to the present embodiment acquires a line spread function related to the first phosphor 202a and a line spread function related to the second phosphor 202b.

Then, the depth position information acquisition unit 42 analyzes the fluorescence image 101, and acquires line spread information regarding luminance for each of the first phosphor 202a and the second phosphor 202b (S14).

Then, the depth position information acquisition unit 42 collates the line spread information on each of the first phosphor 202a and the second phosphor 202b with the corresponding line spread function, thereby deriving depth positions of the first phosphor 202a and the second phosphor 202b (S15). As described above, the depth position information acquisition unit 42 of the present embodiment acquires the depth position information on each of the plurality of phosphors 202 (the first phosphor 202a and the second phosphor 202b) on the basis of the fluorescence image 101.

Then, the image quality adjustment unit 43 performs sharpening processing optimized on the basis of the depth positions of the first phosphor 202a and the second phosphor 202b on each of the first phosphor 202a and the second phosphor 202b (S16).

Thereafter, processing of adjusting brightness between the first phosphor 202a and the second phosphor 202b in the fluorescence image 101 is performed on the fluorescence image 101 (S17). Therefore, even in a case where emission intensity of the first phosphor 202a and the second phosphor 202b is largely different from each other, the brightness of the first phosphor 202a and the second phosphor 202b is appropriately adjusted.

This brightness adjustment processing may be performed by the image quality adjustment unit 43 or may be performed by the observation image generation unit 44. In a case where the brightness adjustment is performed by the image quality adjustment unit 43, the image quality adjustment unit 43 substantially also functions as the observation image generation unit 44.

After the relative brightness between the plurality of phosphors 202 is adjusted for portions corresponding to the plurality of phosphors 202 in the fluorescence image 101 in this manner, the observation image 103 is generated (S18). That is, the observation image 103 is generated from the visible light image 100 and the fluorescence image 101 (particularly, the fluorescence image 101 after the sharpening processing) by the observation image generation unit 44.

A specific method of generating the observation image 103 is not particularly limited. For example, the observation image generation unit 44 may generate the observation image 103 by superimposing, on the visible light image 100, the portions corresponding to the plurality of phosphors 202 in the fluorescence image 101 after the relative brightness between the plurality of phosphors 202 is adjusted. In addition, the observation image generation unit 44 may generate the observation image 103 by performing processing of emphasizing a corresponding portion of a range of the phosphor 202 in the visible light image 100.

Figure 16:
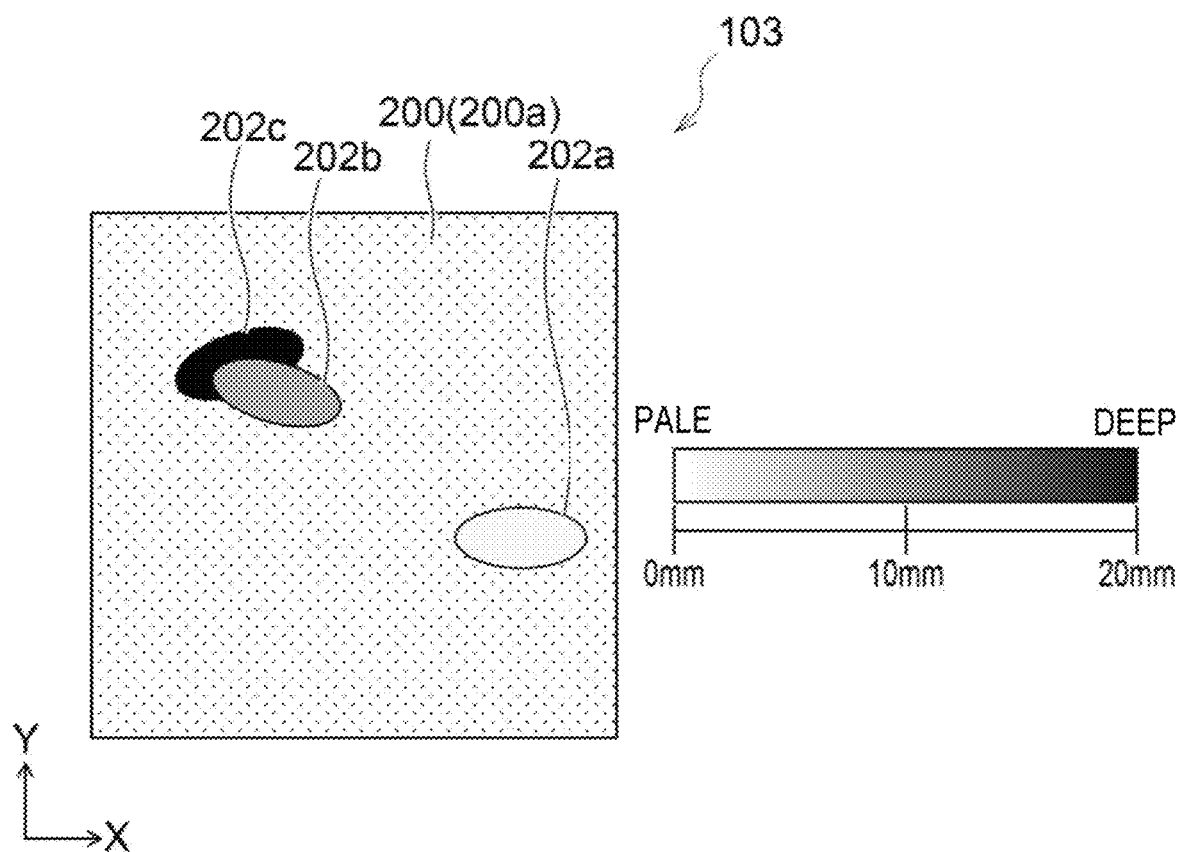
FIG. 16 is a diagram illustrating an example of an observation image according to the second embodiment.
Figure 17:
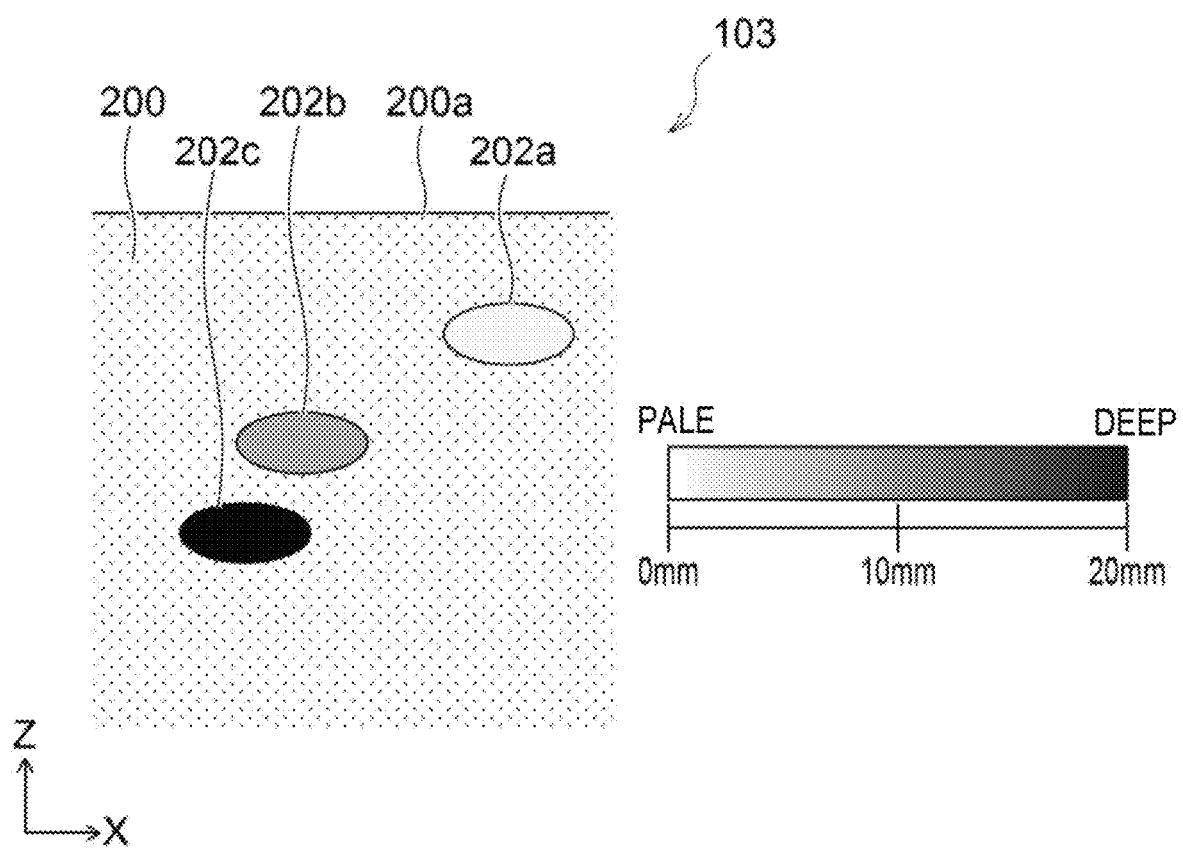
FIG. 17 is a diagram illustrating another example of the observation image according to the second embodiment.

FIG. 16 is a diagram illustrating an example of the observation image 103 according to the second embodiment. FIG. 17 is a diagram illustrating another example of the observation image 103 according to the second embodiment. In the examples illustrated in FIGS. 16 and 17, the biological tissue 200 to be observed includes three phosphors 202 (a first phosphor 202a, a second phosphor 202b, and a third phosphor 202c).

As an example, the observation image generation unit 44 can generate the observation image 103 by emphasizing portions corresponding to ranges of the phosphors 202a, 202b, and 202c in the visible light image 100, similarly to the example illustrated in FIG. 9 described above (see FIG. 16).

In the example illustrated in FIG. 16, shading or color of the portion corresponding to the range of the phosphor 202 of the observation image 103 is adjusted according to depth position information on the corresponding phosphor 202. Therefore, even if the phosphors (the second phosphor 202b and the third phosphor 202c in FIG. 16) overlap each other in the observation image 103, it is possible to distinguish and visually recognize the overlapping phosphors 202b and 202c.

As another example, the observation image generation unit 44 can generate the observation image 103 indicating a state in which the phosphors 202a, 202b, 202c are projected on the XZ plane (see FIG. 17). For example, by projecting each of the phosphors 202a, 202b, and 202c on the XZ plane passing through the observation reference line 203 on the basis of a derived depth position of each of the phosphors 202a, 202b, and 202c, it is possible to generate the observation image 103 as illustrated in FIG. 17. Note that in a case where thickness of each of the phosphors 202a, 202b, and 202c in the Z-axis direction is unknown, the thickness of each of the phosphors may be tentatively determined according to the length (L) of each of the phosphors.

In this case, a relative depth positional relationship among the phosphors 202a, 202b, and 202c can be intuitively grasped from observation image 103.

In the example illustrated in FIG. 17, each of the phosphors 202a, 202b, and 202c is displayed with shading corresponding to the depth position, but shading display or color-coding display corresponding to another standard (for example, the type of the phosphor (fluorescence reagent)) may be performed.

As described above, according to the present embodiment, in a case where the plurality of phosphors 202 is included in the biological tissue 200, the observer can grasp the relative depth positional relationship among the plurality of phosphors 202 from the depth position information on each of the phosphors 202 displayed in the observation image 103.

Therefore, the observer such as the operator and the like can easily and accurately grasp the relative positional relationship among the phosphors 202 in the biological tissue 200 from the observation image 103. As a result, the operator can perform surgery while grasping the relative positional relationship among the phosphors 202, and accuracy and stability of a procedure can be improved.

Third Embodiment

In a third embodiment, elements that are the same as or correspond to those in the first and second embodiments described above are denoted by the same reference numerals, and a detailed description thereof will be omitted.

In the present embodiment, in a case where the biological tissue 200 includes a plurality of types of phosphors 202 having different fluorescence wavelengths, a relative relationship between depth positions of the phosphors 202 is derived without directly deriving the depth position of each phosphor 202. That is, the absolute value of the depth position of each phosphor 202 is derived in the first and second embodiments described above, but in the third embodiment, a relative depth positional relationship between the phosphors 202 is derived.

As an example, a case is assumed in which corresponding values can be acquired for the equivalent scattering coefficient ($\mu_s'$) and the length (L) of the phosphor 202 among the parameters of the above-described spread function (see the formulas 1 to 4 described above), and a corresponding value cannot be acquired for the absorption coefficient ($\mu_a$). As such a case, for example, there is a case where the processing storage unit 45 stores data of the equivalent scattering coefficient ($\mu_s'$) and does not store the absorption coefficient ($\mu_a$).

In this case, similarly to the first and second embodiments described above, the depth position information acquisition unit 42 analyzes the fluorescence image 101, acquires spread information on each of the plurality of phosphors 202 in the fluorescence image 101, and acquires the length "L" of each phosphor 202.

In addition, the depth position information acquisition unit 42 analyzes the visible light image 100 to acquire a type of the biological tissue 200, and acquires the equivalent scattering coefficient ($\mu_s'$) of each phosphor 202 from the processing storage unit 45 on the basis of the type of the biological tissue 200 and the fluorescence wavelength of each phosphor 202.

As a result, for each of the plurality of phosphors 202 contained in the biological tissue 200, "relational expression based on the spread information and the spread function" including the depth position (d) and the absorption coefficient ($\mu_a$) of the phosphor 202 as unknown parameters can be obtained. For example, in a case where two phosphors 202 (that is, the first phosphor 202a and the second phosphor 202b) are included in the biological tissue 200, two relational expressions based on the spread information and the spread function described above are obtained.

Each of the plurality of relational expressions thus obtained represents a depth position and a degree of blurring of the corresponding phosphor 202 without depending on a fluorescence wavelength of the corresponding phosphor 202.

Here, a value of the absorption coefficient ($\mu_a$) is determined according to the type of the biological tissue 200. Therefore, the absorption coefficients ($\mu_a$) of the plurality of phosphors 202 included in the same biological tissue 200 have the same value.

Therefore, by comparing "plurality of relational expressions based on the spread information and the spread function" described above with each other, it is possible to grasp a relative relationship between depth positions of the phosphors 202.

For example, in a case where the above-described two relational expressions relating to the first phosphor 202a and the second phosphor 202b are compared, the substantially unknown parameters are the depth position (d) of the first phosphor 202a, the depth position (d) of the second phosphor 202b, and the common absorption coefficient ($\mu_a$). According to the two relational expressions including these three unknown parameters, it is possible to derive a relative relationship between the depth position of the first phosphor 202a and the depth position of the second phosphor 202b.

As described above, the depth position information acquisition unit 42 of the present embodiment acquires relative depth position information indicating a relative depth positional relationship between the plurality of phosphors 202 on the basis of the plurality of relational expressions obtained for the phosphors 202 and the spread information on the phosphors 202.

Figure 18:
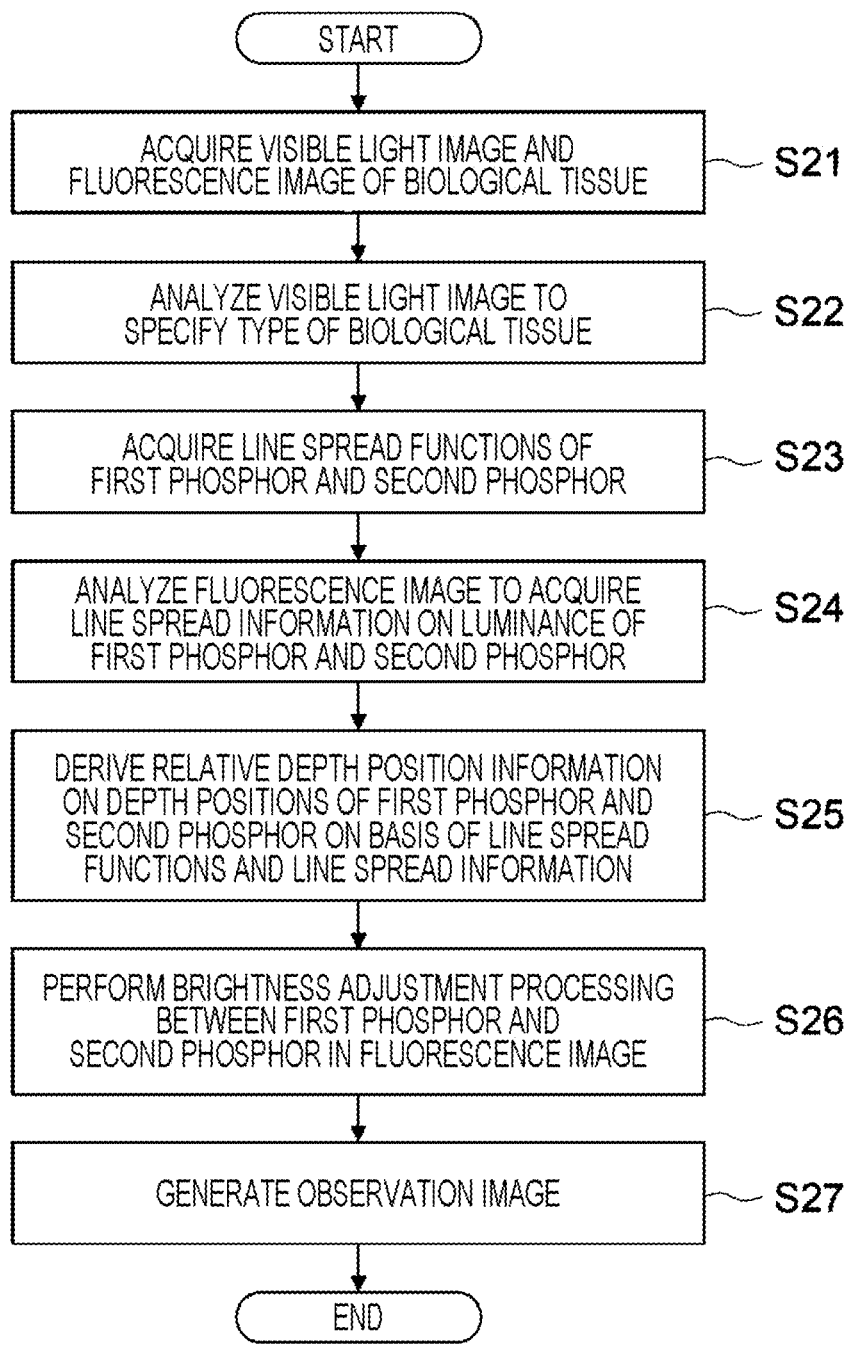
FIG. 18 is a flowchart illustrating an example of a medical image processing method according to a third embodiment.

FIG. 18 is a flowchart illustrating an example of a medical image processing method according to the third embodiment. Hereinafter, a case where the biological tissue 200 includes the two phosphors 202 (the first phosphor 202a and the second phosphor 202b) will be described.

First, the visible light image 100 and the fluorescence image 101 of the biological tissue 200 are acquired from the image capturing unit 11 by the image acquisition unit 41 of the medical image processing apparatus 12 (S21 in FIG. 18).

Then, the depth position information acquisition unit 42 analyzes the visible light image 100 to specify a type of the biological tissue 200 (S22).

Then, the depth position information acquisition unit 42 acquires a line spread function according to the type of the biological tissue 200 for each of the first phosphor 202a and the second phosphor 202b (S23).

Then, the depth position information acquisition unit 42 analyzes the fluorescence image 101 to acquire line spread information regarding luminance for each of the first phosphor 202a and the second phosphor 202b (S24).

Then, the depth position information acquisition unit 42 collates the line spread information on each of the first phosphor 202a and the second phosphor 202b with the corresponding line spread function to derive relative depth position information between the first phosphor 202a and the second phosphor 202b (S25). As an example, the depth position information acquisition unit 42 acquires depth position information on each of the first phosphor 202a and the second phosphor 202b on the basis of the fluorescence image 101. Then, the depth position information acquisition unit 42 can derive relative depth position information between the first phosphor 202a and the second phosphor 202b by comparing the depth position information on the first phosphor 202a with the depth position information on the second phosphor 202b.

Thereafter, the image quality adjustment unit 43 of the present embodiment performs processing of adjusting brightness between the first phosphor 202a and the second phosphor 202b in the fluorescence image 101 on the fluorescence image 101 (S26).

Then, the observation image generation unit 44 generates the observation image 103 from the visible light image 100 and the fluorescence image 101 (particularly, the fluorescence image 101 after the brightness adjustment) (S27).

For example, the observation image generation unit 44 can generate the observation image 103 by superimposing, on the visible light image 100, portions corresponding to the plurality of phosphors 202 in the fluorescence image 101 after the relative brightness between the plurality of phosphors 202 is adjusted. Alternatively, the observation image generation unit 44 can generate the observation image 103 by acquiring a range of each phosphor 202 from the fluorescence image 101 and emphasizing a portion in the visible light image 100 corresponding to the range of each phosphor 202.

Figure 19:
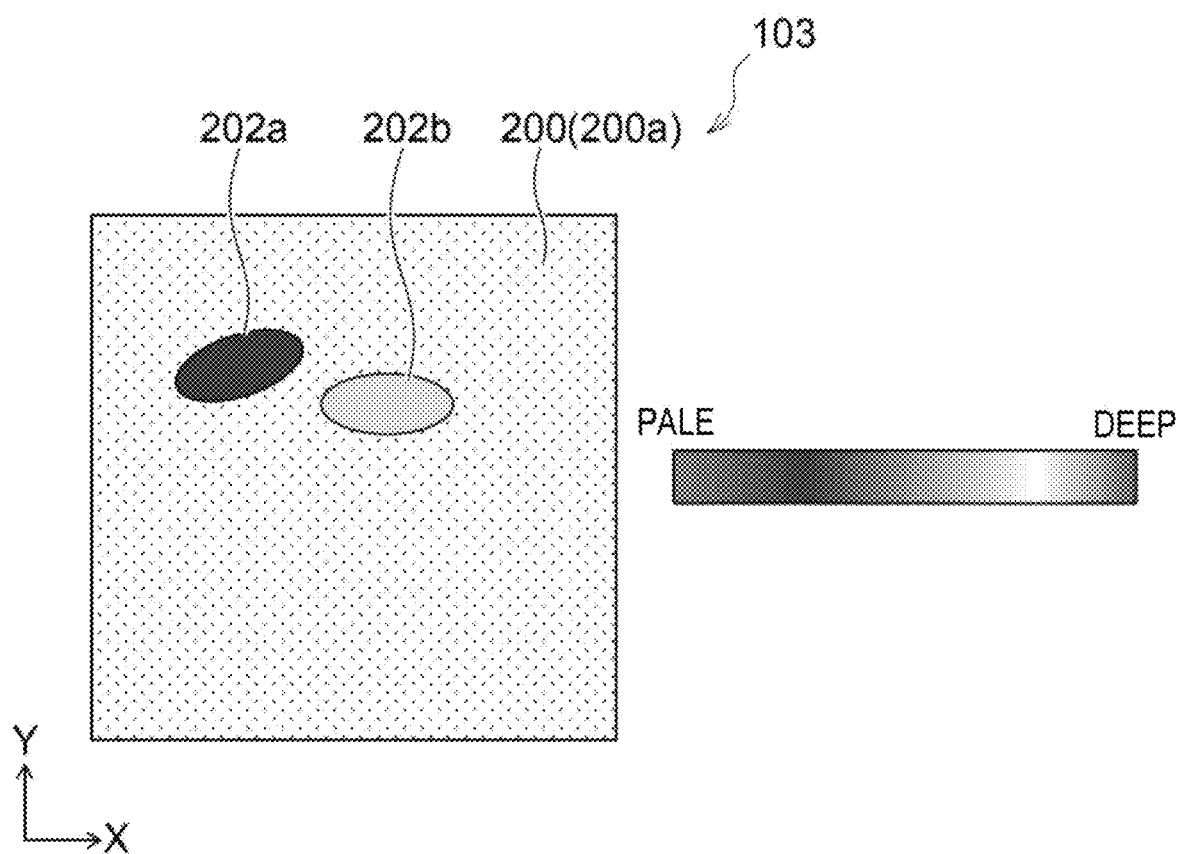
FIG. 19 is a diagram illustrating an example of an observation image according to the third embodiment.

FIG. 19 is a diagram illustrating an example of the observation image 103 according to the third embodiment.

In the observation image 103 illustrated in FIG. 19, filled colors of the first phosphor 202a and the second phosphor 202b are changed according to relative depth positions of the first phosphor 202a and the second phosphor 202b. As the depth position of the first phosphor 202a and the depth position of the second phosphor 202b are closer to each other, the first phosphor 202a and the second phosphor 202b are filled with colors closer to that at the center of a bar-shaped indicator display illustrated in FIG. 19. On the other hand, as the depth position of the first phosphor 202a and the depth position of the second phosphor 202b are farther from each other, the first phosphor 202a and the second phosphor 202b are filled with colors closer to those at both ends of the bar-shaped indicator display illustrated in FIG. 19.

Note that, in the example illustrated in FIG. 19, the relative depth position is represented by display density of each phosphor 202 in the observation image 103, but the relative depth positions between the phosphors 202 may be represented in the observation image 103 on the basis of another display state (for example, shading, brightness, and the like).

As described above, according to the present embodiment, in a case where the plurality of phosphors 202 is included in the biological tissue 200, the observer can grasp the relative depth positional relationship between the plurality of phosphors 202 from the depth position information on each of the phosphors 202 displayed in the observation image 103.

Application Examples

Hereinafter, an example of a microscope system to which the medical observation system 10, the medical image processing apparatus 12, and the medical image processing method described above can be applied will be described. Note that the medical observation system 10, the medical image processing apparatus 12, and the medical image processing method described above can also be applied to any system, apparatus, method, and the like other than the microscope system described below.

Figure 20:
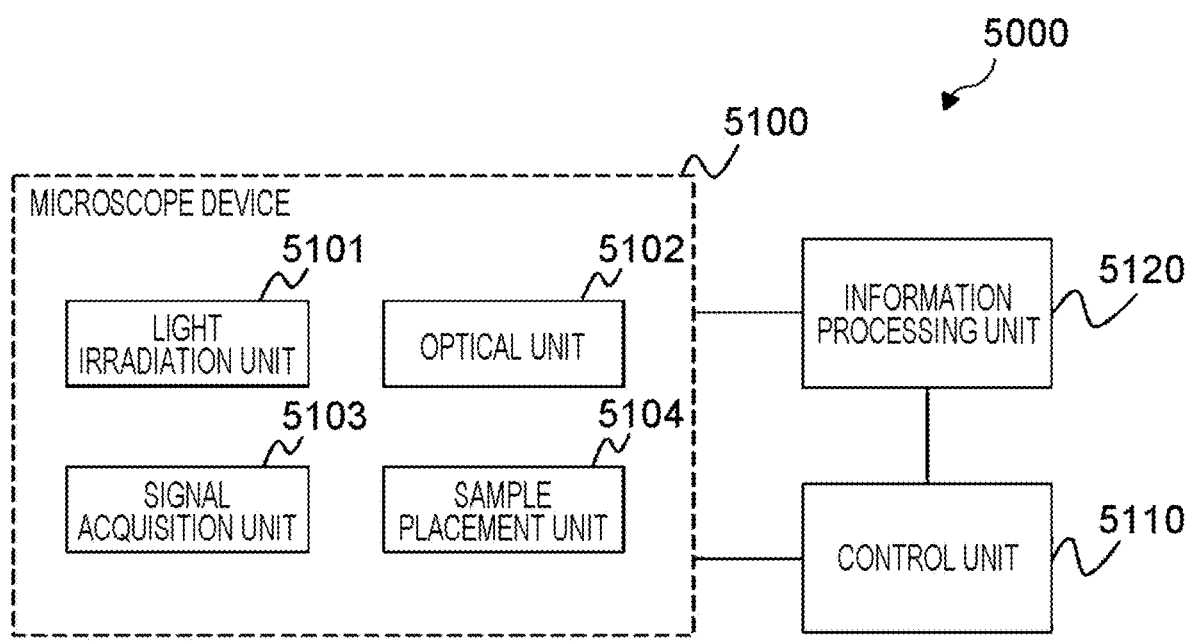
FIG. 20 is a diagram schematically illustrating an overall configuration of a microscope system.

A configuration example of the microscope system of the present disclosure is illustrated in FIG. 20. A microscope system 5000 illustrated in FIG. 20 includes a microscope device 5100, a control unit 5110, and an information processing unit 5120. The microscope device 5100 includes a light irradiation unit 5101, an optical unit 5102, and a signal acquisition unit 5103. Moreover, the microscope device 5100 may include a sample placement unit 5104 on which a biological sample S is placed. Note that the configuration of the microscope device is not limited to that illustrated in FIG. 20. For example, the light irradiation unit 5101 may exist outside the microscope device 5100, and for example, a light source not included in the microscope device 5100 may be used as the light irradiation unit 5101. Furthermore, the light irradiation unit 5101 may be arranged such that the sample placement unit 5104 is sandwiched between the light irradiation unit 5101 and the optical unit 5102, and for example, may be arranged on a side where the optical unit 5102 exists. The microscope device 5100 may be configured by one or two or more of bright field observation, phase difference observation, differential interference observation, polarization observation, fluorescence observation, and dark field observation.

The microscope system 5000 may be configured as a so-called whole slide imaging (WSI) system or a digital pathology system, and may be used for pathological diagnosis. Furthermore, the microscope system 5000 may also be configured as a fluorescence imaging system, in particular a multiple fluorescence imaging system.

For example, the microscope system 5000 may be used to perform intraoperative pathological diagnosis or remote pathological diagnosis. In the intraoperative pathological diagnosis, while surgery is being performed, the microscope device 5100 can acquire data of the biological sample S acquired from a subject of the surgery and then transmit the data to the information processing unit 5120. In the remote pathological diagnosis, the microscope device 5100 can transmit acquired data of the biological sample S to the information processing apparatus 5120 existing in a place (another room, a building, or the like) away from the microscope device 5100. Then, in these diagnoses, the information processing apparatus 5120 receives and outputs the data. A user of the information processing apparatus 5120 can perform pathological diagnosis on the basis of the output data.

(Biological Sample)

The biological sample S may be a sample containing a biological component. The biological component may be a tissue or a cell of a living body, a liquid component of a living body (blood, urine, and the like), a culture, or a living cell (a cardiomyocyte, a nerve cell, a fertilized egg, etc.).

The biological sample may be a solid, a specimen fixed with a fixing reagent such as paraffin, or a solid formed by freezing. The biological sample may be a section of the solid. Specific examples of the biological sample include a section of a biopsy sample.

The biological sample may be subjected to treatment such as staining or labeling. The treatment may be staining for showing a form of a biological component or showing a substance of the biological component (such as a surface antigen), and examples thereof include hematoxylin-eosin (HE) staining and immunohistochemistry staining. The biological sample may be subjected to the treatment with one or two or more reagents, and the reagent may be a fluorescent dye, a coloring reagent, a fluorescent protein, or a fluorescently labeled antibody.

The specimen may be prepared for the purpose of pathological diagnosis, clinical examination, or the like from a specimen or a tissue sample collected from a human body. Furthermore, the specimen is not limited to the human body, and may be derived from an animal, a plant, or another material. The specimen has different properties depending on a type of tissue used (for example, organ or cell), a type of disease to be targeted, an attribute of a subject (for example, age, sex, blood type, or race), a lifestyle of a subject (for example, a dietary habit, an exercise habit, or a smoking habit), or the like. The specimen may be managed with identification information (bar code information, QR code (trademark) information, and the like) that can identify each specimen.

(Light Irradiation Unit)

The light irradiation unit 5101 is a light source for illuminating the biological sample S and an optical unit that guides light emitted from the light source to a specimen. The light source can irradiate the biological sample with visible light, ultraviolet light, infrared light, or a combination thereof. The light source may be one or two or more of a halogen lamp, a laser light source, an LED lamp, a mercury lamp, and a xenon lamp. A type and/or a wavelength of the light source in fluorescence observation may be plural, and may be appropriately selected by those skilled in the art. The light irradiation unit may have a transmissive, reflective, or epi-illumination (coaxial epi-illumination or side-illumination) configuration.

(Optical Unit)

The optical unit 5102 is configured to guide light from the biological sample S to the signal acquisition unit 5103. The optical unit can be configured to enable the microscope device 5100 to observe or image the biological sample S.

The optical unit 5102 can include an objective lens. A type of the objective lens may be appropriately selected by those skilled in the art according to an observation method. Furthermore, the optical unit may include a relay lens for relaying an image enlarged by the objective lens to the signal acquisition unit. The optical unit can further include an optical component other than the objective lens and the relay lens, an eyepiece lens, a phase plate, a condenser lens, and the like.

Furthermore, the optical unit 5102 may further include a wavelength separation unit configured to separate light having a predetermined wavelength from the light from the biological sample S. The wavelength separation unit can be configured to selectively allow light of a predetermined wavelength or wavelength range to reach the signal acquisition unit. The wavelength separation unit may include, for example, one or two or more of a filter that selectively transmits light, a polarizing plate, a prism (Wollaston prism), and a diffraction grating. The optical component included in the wavelength separation unit may be disposed, for example, on an optical path from the objective lens to the signal acquisition unit. The wavelength separation unit is provided in the microscope device in a case where fluorescence observation is performed, particularly in a case where an excitation light irradiation unit is included. The wavelength separation unit can be configured to separate fluorescent light from each other or separate white light and fluorescent light.

(Signal Acquisition Unit)

The signal acquisition unit 5103 can be configured to receive light from the biological sample S and convert the light into an electric signal, particularly a digital electric signal. The signal acquisition unit may be configured to be able to acquire data regarding the biological sample S on the basis of the electric signal. The signal acquisition unit may be configured to be able to acquire data of an image (an image, particularly a still image, a time-lapse image, or a moving image) of the biological sample S, and in particular, can be configured to acquire data of an image enlarged by the optical unit. The signal acquisition unit includes one or a plurality of imaging elements including a plurality of pixels arranged one-dimensionally or two-dimensionally, a CMOS, a CCD, or the like. The signal acquisition unit may include an imaging element for acquiring a low-resolution image and an imaging element for acquiring a high-resolution image, or may include an imaging element for sensing for AF or the like and an imaging element for image output for observation or the like. In addition to the plurality of pixels, the imaging element can include a signal processing unit (including one, two, or three of a CPU, a DSP, and a memory) that performs signal processing using a pixel signal from each pixel, and an output control unit that controls output of image data generated from the pixel signal and processing data generated by the signal processing unit. Moreover, the imaging element can include an asynchronous event detection sensor that detects, as an event, that a luminance change of a pixel that photoelectrically converts incident light exceeds a predetermined threshold. The imaging element including the plurality of pixels, the signal processing unit, and the output control unit can be preferably configured as a one-chip semiconductor device.

(Control Unit)

The control unit 5110 controls imaging by the microscope device 5100. The control unit can adjust a positional relationship between the optical unit 5102 and the sample placement unit 5104 by driving movement of the optical unit and/or the sample placement unit for imaging control. The control unit 5110 can move the optical unit and/or the sample placement unit in a direction of approaching or separating from each other (for example, an optical axis direction of the objective lens). Furthermore, the control unit may move the optical unit and/or the sample placement unit in any direction on a plane perpendicular to the optical axis direction. The control unit may control the light irradiation unit 5101 and/or the signal acquisition unit 5103 for imaging control.

(Sample Placement Unit)

The sample placement unit 5104 may be configured to be able to fix a position of the biological sample on the sample placement unit, and may be a so-called stage. The sample placement unit 5104 can be configured to be able to move the position of the biological sample in the optical axis direction of the objective lens and/or the direction perpendicular to the optical axis direction.

(Information Processing Unit)

The information processing unit 5120 can acquire data (such as imaging data) acquired by the microscope device 5100 from the microscope device 5100. The information processing unit can perform image processing on the imaging data. The image processing may include color separation processing. The color separation processing can include processing of extracting data of a light component of a predetermined wavelength or wavelength range from the imaging data to generate image data, processing of removing data of a light component of a predetermined wavelength or wavelength range from the imaging data, or the like. Furthermore, the image processing can include autofluorescence separation processing of separating an autofluorescence component and a pigment composition of a tissue section, and fluorescence separation processing of separating wavelengths of pigments having different fluorescence wavelengths from each other. In the autofluorescence separation processing, processing of removing an autofluorescence component from image information on another specimen using an autofluorescence signal extracted from one of the plurality of specimens having the same or similar properties may be performed.

The information processing unit 5120 may transmit data for imaging control to the control unit 5110, and the control unit 5110 that has received the data may control imaging by the microscope device 5100 according to the data.

The information processing unit 5120 may be configured as an information processing apparatus such as a general-purpose computer, and may include a CPU, a RAM, and a ROM. The information processing unit may be included in a housing of the microscope device 5100 or may be outside the housing. Furthermore, various processing or functions by the information processing unit may be realized by a server computer or a cloud connected via a network.

A method of imaging the biological sample S by the microscope device 5100 may be appropriately selected by those skilled in the art according to a type of the biological sample, a purpose of imaging, and the like. An example of the imaging method will be described below.

One example of the imaging method is as follows. The microscope device can first specify an imaging target region. The imaging target region may be specified so as to cover an entire region where the biological sample exists, or may be specified so as to cover a target portion (a portion where a target tissue section, a target cell, or a target lesion exists) of the biological sample. Next, the microscope device divides the imaging target region into a plurality of divided regions of a predetermined size, and the microscope device sequentially images each of the divided regions. Therefore, an image of each divided region is acquired.

Figure 21:
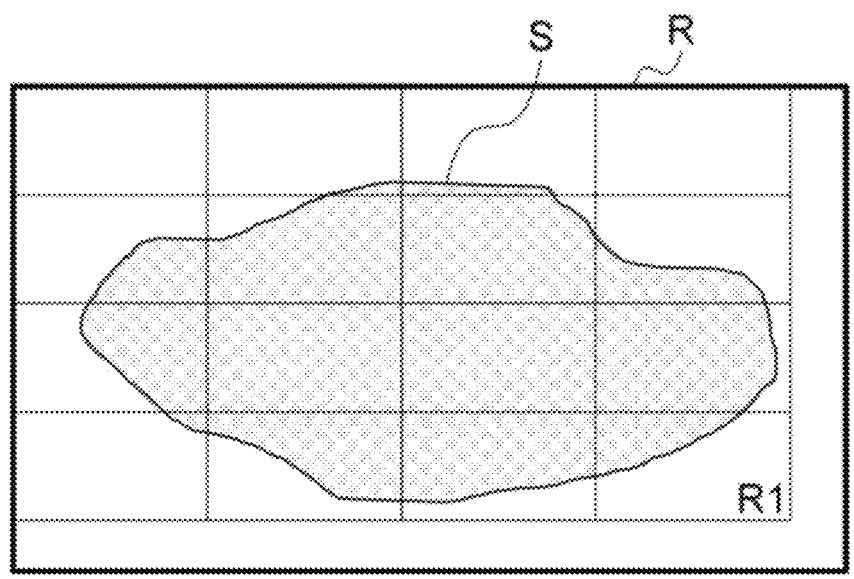
FIG. 21 is a diagram illustrating an example of an imaging method.

As illustrated in FIG. 21, the microscope device specifies an imaging target region R covering the entire biological sample S. Then, the microscope device divides the imaging target region R into 16 divided regions. Then, the microscope device images a divided region R1, and then can image any region in the regions included in the imaging target region R, such as a region adjacent to the divided region R1. Then, the divided regions are imaged until there is no divided region that has not been imaged. Note that a region other than the imaging target region R may also be imaged on the basis of captured image information on the divided regions.

In order to image a next divided region after imaging a certain divided region, a positional relationship between the microscope device and the sample placement unit is adjusted. The adjustment may be performed by movement of the microscope device, movement of the sample placement unit, or both of these movement. In this example, an imaging device that images each divided region may be a two-dimensional imaging element (an area sensor) or a one-dimensional imaging element (a line sensor). The signal acquisition unit may image each divided region via the optical unit. Furthermore, the imaging of each divided region may be continuously performed while moving the microscope device and/or the sample placement unit, or the movement of the microscope device and/or the sample placement unit may be stopped at the time of imaging each divided region. The imaging target region may be divided such that parts of the divided regions overlap, or the imaging target region may be divided such that the divided regions do not overlap. Each divided region may be imaged a plurality of times while changing imaging conditions such as a focal length and/or an exposure time.

Furthermore, the information processing apparatus can combine a plurality of adjacent divided regions to generate image data of a wider region. By performing the combining processing over the entire imaging target region, an image of a wider region can be acquired for the imaging target region. Furthermore, image data with lower resolution can be generated from the image of the divided region or the image subjected to the combining processing.

Another example of the imaging method is as follows. The microscope device can first specify an imaging target region. The imaging target region may be specified so as to cover an entire region where the biological sample exists, or may be specified so as to cover a target portion (a portion where a target tissue section or a target cell exists) of the biological sample. Next, the microscope device scans and images a partial region (also referred to as "divided scan region") of the imaging target region in one direction (also referred to as "scan direction") in a plane perpendicular to an optical axis. When the scan of the divided scan region is completed, next, a divided scan region adjacent to the scan region is scanned. These scanning operations are repeated until the entire imaging target region is imaged.

Figure 22:
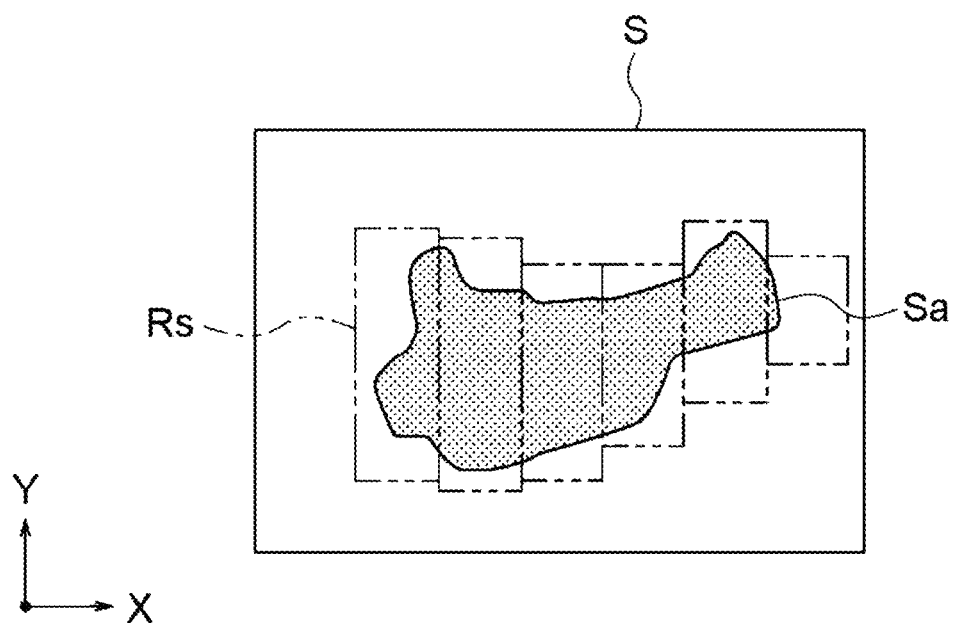
FIG. 22 is a diagram illustrating an example of an imaging method.

As illustrated in FIG. 22, the microscope device specifies, as an imaging target region Sa, a region where a tissue section exists (a gray portion) in the biological sample S. Then, the microscope device scans a divided scan region Rs in a Y-axis direction in the imaging target region Sa. When the scan of the divided scan region Rs is completed, the microscope device next scans an adjacent divided scan region in an X-axis direction. This operation is repeated until scanning is completed for the entire imaging target region Sa.

A positional relationship between the microscope device and the sample placement unit is adjusted for scanning each divided scan region and imaging a next divided scan region after imaging a certain divided scan region. The adjustment may be performed by movement of the microscope device, movement of the sample placement unit, or both of these movement. In this example, an imaging device that images each divided scan region may be a one-dimensional imaging element (a line sensor) or a two-dimensional imaging element (an area sensor). The signal acquisition unit may image each divided region via a magnifying optical system. Furthermore, the imaging of each divided scan region may be continuously performed while moving the microscope device and/or the sample placement unit. The imaging target region may be divided such that parts of the divided scan regions overlap, or the imaging target region may be divided such that the divided scan regions do not overlap. Each divided scan region may be imaged a plurality of times while changing imaging conditions such as a focal length and/or an exposure time.

Furthermore, the information processing apparatus can combine a plurality of adjacent divided scan regions to generate image data of a wider region. By performing the combining processing over the entire imaging target region, an image of a wider region can be acquired for the imaging target region. Furthermore, image data with lower resolution can be generated from the image of the divided scan region or the image subjected to the combining processing.

It should be noted that the embodiments and modifications disclosed in the present specification are illustrative only in all respects and are not to be construed as limiting. The above-described embodiments and modifications can be omitted, replaced, and changed in various forms without departing from the scope and spirit of the appended claims. For example, the above-described embodiments and modifications may be combined in whole or in part, and other embodiments may be combined with the above-described embodiments or modifications. Furthermore, the effects of the present disclosure described in the present specification are merely exemplification, and other effects may be provided.

A technical category embodying the above technical idea is not limited. For example, the above-described technical idea may be embodied by a computer program for causing a computer to execute one or a plurality of procedures (steps) included in a method of manufacturing or using the above-described apparatus. In addition, the above-described technical idea may be embodied by a computer-readable non-transitory recording medium in which such a computer program is recorded.

The present disclosure can also have the following configurations.

[Item 1]

A medical image processing apparatus including:

an image acquisition unit that acquires a fluorescence image obtained by imaging a biological tissue including a phosphor while irradiating the biological tissue with excitation light; and a depth position information acquisition unit that acquires depth position information related to a depth position of the phosphor on the basis of the fluorescence image, in which the depth position information acquisition unit acquires spread information indicating an image intensity distribution of the phosphor in the fluorescence image by analyzing the fluorescence image, and acquires the depth position information by collating the spread information with a spread function representing an image intensity distribution in the biological tissue.

[Item 2]

The medical image processing apparatus according to item 1, in which
the image acquisition unit acquires a visible light image obtained by imaging the biological tissue while irradiating the biological tissue with visible light, and
the depth position information acquisition unit estimates a type of the biological tissue by analyzing the visible light image, and
acquires the spread function according to the estimated type of the biological tissue.

[Item 3]

The medical image processing apparatus according to item 1 or 2, in which
the spread information is a luminance distribution of the phosphor in the fluorescence image, and
the spread function is a line spread function based on the luminance distribution of the phosphor and the depth position information.

[Item 4]

The medical image processing apparatus according to any one of items 1 to 3, in which
the spread function includes a scattering coefficient determined according to a fluorescence wavelength of the phosphor as a parameter, and
the depth position information acquisition unit
acquires the scattering coefficient corresponding to the fluorescence wavelength, and
acquires the depth position information on the basis of the spread function reflecting the scattering coefficient and the spread information.

[Item 5]

The medical image processing apparatus according to any one of items 1 to 4, in which
the biological tissue includes a plurality of phosphors having different fluorescence wavelengths,
the image acquisition unit acquires the fluorescence image obtained by irradiating the biological tissue with the excitation light of each of the plurality of phosphors and imaging the biological tissue, and
the depth position information acquisition unit acquires the depth position information on each of the plurality of phosphors on the basis of the fluorescence image.

[Item 6]

The medical image processing apparatus according to item 5, in which the depth position information acquisition unit acquires relative depth position information indicating a relative relationship of the depth positions among the plurality of phosphors on the basis of the depth position information on each of the plurality of phosphors.

[Item 7]

The medical image processing apparatus according to any one of items 1 to 6, further including an image quality adjustment unit that performs sharpening processing according to the depth position information on the fluorescence image.

[Item 8]

The medical image processing apparatus according to item 7, further including
an observation image generation unit that generates an observation image, in which
the image acquisition unit acquires a visible light image obtained by imaging the biological tissue while irradiating the biological tissue with visible light, and
in the observation image, a portion corresponding to the phosphor in the fluorescence image after undergoing the sharpening processing is superimposed on the visible light image.

[Item 9]

The medical image processing apparatus according to item 8, in which
the biological tissue includes a plurality of phosphors having different fluorescence wavelengths,
the image acquisition unit acquires the fluorescence image obtained by imaging the biological tissue while irradiating the biological tissue with the excitation light of each of the plurality of phosphors,
the depth position information acquisition unit acquires the depth position information on each of the plurality of phosphors on the basis of the fluorescence image, and
the observation image generation unit
adjusts relative brightness between the plurality of phosphors for portions corresponding to the plurality of phosphors in the fluorescence image, and
generates the observation image by superimposing, on the visible light image, the portions corresponding to the plurality of phosphors in the fluorescence image after the relative brightness between the plurality of phosphors is adjusted.

[Item 10]

The medical image processing apparatus according to item 7, further including
an observation image generation unit that generates an observation image, in which
the image acquisition unit acquires a visible light image obtained by imaging the biological tissue while irradiating the biological tissue with visible light, and
the observation image generation unit
specifies a range of the phosphor in the biological tissue by analyzing the fluorescence image after undergoing the sharpening processing, and
generates the observation image in which a portion corresponding to the range of the phosphor is emphasized in the visible light image.

[Item 11]

The medical image processing apparatus according to item 10, in which the observation image generation unit generates the observation image in which the portion corresponding to the range of the phosphor in the visible light image is emphasized according to the depth position information.

[Item 12]

A medical observation system including:
an image capturing unit that acquires a fluorescence image by imaging a biological tissue including a phosphor while irradiating the biological tissue with excitation light; and
a medical image processing apparatus that analyzes the fluorescence image, in which
the medical image processing apparatus includes
an image acquisition unit that acquires the fluorescence image and
a depth position information acquisition unit that acquires depth position information related to a depth position of the phosphor on the basis of the fluorescence image, and
the depth position information acquisition unit
acquires spread information indicating an image intensity distribution of the phosphor in the fluorescence image by analyzing the fluorescence image, and acquires the depth position information by collating the spread information with a spread function representing an image intensity distribution in the biological tissue.

[Item 13]

The medical observation system according to item 12, further including
a display device that displays an observation image in which a location of the phosphor in the biological tissue is visually recognizable, in which
the image capturing unit acquires a visible light image by imaging the biological tissue while irradiating the biological tissue with visible light, and
the medical image processing apparatus includes an observation image generation unit that generates the observation image on the basis of the visible light image and the fluorescence image.

[Item 14]

The medical observation system according to item 12 or 13, in which the image capturing unit adjusts imaging conditions on the basis of the depth position information.

[Item 15]

A medical image processing method including:
a step of acquiring a fluorescence image obtained by imaging a biological tissue including a phosphor while irradiating the biological tissue with excitation light;
a step of acquiring spread information indicating an image intensity distribution of the phosphor in the fluorescence image by analyzing the fluorescence image; and
a step of acquiring depth position information related to a depth position of the phosphor by collating the spread information with a spread function representing an image intensity distribution in the biological tissue.

[Item 16]

A program for causing a computer to execute:
a procedure of acquiring a fluorescence image obtained by imaging a biological tissue including a phosphor while irradiating the biological tissue with excitation light;
a procedure of acquiring spread information indicating an image intensity distribution of the phosphor in the fluorescence image by analyzing the fluorescence image; and
a procedure of acquiring depth position information related to a depth position of the phosphor by collating the spread information with a spread function representing an image intensity distribution in the biological tissue.

REFERENCE SIGNS LIST

10 Medical observation system
11 Image capturing unit
12 Medical image processing apparatus
13 Output unit
21 Camera controller
22 Camera storage unit
23 Imaging unit
24 Light irradiation unit
25 Sample support unit
31 Output controller
32 Output storage unit
33 Display device
40 Image processing controller
41 Image acquisition unit
42 Depth position information acquisition unit
43 Image quality adjustment unit
44 Observation image generation unit
45 Processing storage unit
100 Visible light image
101 Fluorescence image
102 Sharp fluorescence image
103 Observation image
200 Biological tissue
200a Tissue surface
201 Blood vessel
202 Phosphor
203 Observation reference line

The invention claimed is:

1. A medical image processing apparatus comprising: circuitry configured to: acquire a fluorescence image obtained by imaging a biological tissue including a phosphor while irradiating the biological tissue with excitation light;
acquire depth position information related to a depth position of the phosphor on a basis of the fluorescence image, wherein the circuitry is further configured to
acquire spread information indicating an image intensity distribution of the phosphor in the fluorescence image by analyzing the fluorescence image,
acquire the depth position information by collating the spread information with a spread function representing an image intensity distribution in the biological tissue,
perform sharpening processing according to the depth position information on the fluorescence image,
acquire a visible light image obtained by imaging the biological tissue while irradiating the biological tissue with visible light,
specify a range of the phosphor in the biological tissue by analyzing the fluorescence image after undergoing the sharpening processing, and
generate an observation image in which a portion corresponding to the range of the phosphor is emphasized in the visible light image.

2. The medical image processing apparatus according to claim 1, wherein the circuitry is further configured to estimate a type of the biological tissue by analyzing the visible light image, and acquire the spread function according to the estimated type of the biological tissue.

3. The medical image processing apparatus according to claim 1, wherein the spread information is a luminance distribution of the phosphor in the fluorescence image, and the spread function is a line spread function based on the luminance distribution of the phosphor and the depth position information.

4. The medical image processing apparatus according to claim 1, wherein the circuitry is further configured to acquire the scattering coefficient corresponding to the fluorescence wavelength, wherein the spread function includes the scattering coefficient as a parameter, and acquire the depth position information on a basis of the spread function reflecting the scattering coefficient and the spread information.

5. The medical image processing apparatus according to claim 1, wherein
the biological tissue includes a plurality of phosphors having different fluorescence wavelengths, and
the circuitry is further configured to
acquire the fluorescence image obtained by irradiating the biological tissue with the excitation light of each of the plurality of phosphors and imaging the biological tissue, and
acquire the depth position information on each of the plurality of phosphors on a basis of the fluorescence image.

6. The medical image processing apparatus according to claim 5, wherein the circuitry is further configured to acquire relative depth position information indicating a relative relationship of the depth positions among the plurality of phosphors on a basis of the depth position information on each of the plurality of phosphors.

7. The medical image processing apparatus according to claim 1, wherein the biological tissue includes a plurality of phosphors having different fluorescence wavelengths, and the circuitry is further configured to acquire the fluorescence image obtained by imaging the biological tissue with the excitation light of each of the plurality of phosphors, acquire the depth position information on each of the plurality of phosphors on a basis of the fluorescence image, adjust relative brightness between the plurality of phosphors for portions corresponding to the plurality of phosphors in the fluorescence image, and generate the observation image by superimposing, on the visible light image, the portions corresponding to the plurality of phosphors in the fluorescence image after the relative brightness between the plurality of phosphors is adjusted.

8. The medical image processing apparatus according to claim 1, wherein the circuitry is further configured to generate the observation image in which the portion corresponding to the range of the phosphor in the visible light image is emphasized according to the depth position information.

9. A medical image processing method comprising:

acquiring a fluorescence image obtained by imaging a biological tissue including a phosphor while irradiating the biological tissue with excitation light;

acquiring spread information indicating an image intensity distribution of the phosphor in the fluorescence image by analyzing the fluorescence image;

acquiring depth position information related to a depth position of the phosphor by collating the spread information with a spread function representing an image intensity distribution in the biological tissue;

performing sharpening processing according to the depth position information on the fluorescence image;

acquiring a visible light image obtained by imaging the biological tissue while irradiating the biological tissue with visible light, and specifying a range of the phosphor in the biological tissue by analyzing the fluorescence image after undergoing the sharpening processing; and generating an observation image in which a portion corresponding to the range of the phosphor is emphasized in the visible light image.

10. A non-transitory computer-readable medium having stored thereon instructions which, when executed by a computer, cause the computer to perform a method comprising:

acquiring a fluorescence image obtained by imaging a biological tissue including a phosphor while irradiating the biological tissue with excitation light;

acquiring spread information indicating an image intensity distribution of the phosphor in the fluorescence image by analyzing the fluorescence image;

acquiring depth position information related to a depth position of the phosphor by collating the spread information with a spread function representing an image intensity distribution in the biological tissue;

performing sharpening processing according to the depth position information on the fluorescence image;

acquiring a visible light image obtained by imaging the biological tissue while irradiating the biological tissue with visible light;

specifying a range of the phosphor in the biological tissue by analyzing the fluorescence image after undergoing the sharpening processing; and generating an observation image in which a portion corresponding to the range of the phosphor is emphasized in the visible light image.

* * * * *